(12) United States Patent
Merager

(10) Patent No.: US 7,823,538 B1
(45) Date of Patent: Nov. 2, 2010

(54) HYDRATION SYSTEM FOR ANIMALS

(76) Inventor: Randall S. Merager, 7700 Ostrom Ave., Van Nuys, CA (US) 91406

( * ) Notice: Subject to any disclaimer, the term of this patent is extended or adjusted under 35 U.S.C. 154(b) by 252 days.

(21) Appl. No.: 12/157,754

(22) Filed: Jun. 13, 2008

(51) Int. Cl.
*A01K 7/04* (2006.01)
(52) U.S. Cl. ....................................... 119/72
(58) Field of Classification Search ................ 119/51.5, 119/61.5, 61.55, 72–75
See application file for complete search history.

(56) References Cited

U.S. PATENT DOCUMENTS

| | | | | |
|---|---|---|---|---|
| 1,176,193 A * | 3/1916 | Bedell | ......................... | 119/74 |
| 1,259,253 A * | 3/1918 | McCullough | ................ | 119/74 |
| 1,552,076 A * | 9/1925 | Mosier | ....................... | 119/72 |
| 1,603,198 A * | 10/1926 | Edington | .................... | 119/74 |
| 2,239,393 A * | 4/1941 | Lipman | ....................... | 119/74 |
| 3,027,872 A * | 4/1962 | Nelson | ........................ | 119/81 |
| 3,138,140 A * | 6/1964 | Byrd | ............................ | 119/80 |
| 4,055,147 A | 10/1977 | Fletcher et al. | ............ | 119/72.5 |
| 4,069,793 A | 1/1978 | Gower | ..................... | 119/51.13 |
| 4,181,097 A | 1/1980 | Betsuno | .................. | 119/51.11 |
| 4,270,490 A * | 6/1981 | Kopp | ........................ | 119/61.5 |
| 4,397,266 A * | 8/1983 | Noland et al. | ................. | 119/73 |
| 4,665,862 A | 5/1987 | Pitchford, Jr. | ............ | 119/51.11 |
| 4,953,506 A * | 9/1990 | Sanders | ................... | 119/61.53 |
| 5,205,242 A * | 4/1993 | Kasselman | ............... | 119/61.53 |
| 5,253,609 A * | 10/1993 | Partelow et al. | .......... | 119/61.53 |
| 5,284,173 A | 2/1994 | Graves et al. | ................... | 137/1 |
| 5,297,504 A | 3/1994 | Carrico | ........................ | 119/61 |
| 5,960,740 A * | 10/1999 | Pelsor | ...................... | 119/61.54 |
| 6,044,797 A | 4/2000 | Leason | ........................ | 119/72 |
| 6,062,166 A | 5/2000 | Macrina | .................. | 119/51.11 |
| 6,125,790 A * | 10/2000 | Breedwell | .................. | 119/51.5 |
| 7,089,881 B2 | 8/2006 | Plante | ......................... | 119/74 |
| 7,152,550 B2 | 12/2006 | Walker | ...................... | 119/51.5 |
| 7,270,082 B2 | 9/2007 | Plante | ......................... | 119/74 |
| 7,600,486 B2 * | 10/2009 | Ellis | .......................... | 119/61.5 |
| 2005/0252457 A1 | 11/2005 | Morosin et al. | ......... | 119/51.13 |
| 2009/0120370 A1 * | 5/2009 | Maeda | ......................... | 119/73 |

FOREIGN PATENT DOCUMENTS

| | | |
|---|---|---|
| CA | 2393654 | 2/2004 |
| CA | 2467364 | 12/2005 |
| WO | 2004062354 | 7/2004 |

OTHER PUBLICATIONS

Doctors Foster & Smith: Advertised on Internet—drsfostersmith.com.
shop.com: Advertised on Internet—shop.com.
Smarthome: Advertised on Internet—smarthome.com.
Crystal Clear Pet Products Ltd: Advertised on Internet—crystalclearpet.com.

* cited by examiner

*Primary Examiner*—Michael R Mansen
*Assistant Examiner*—Ebony Evans
(74) *Attorney, Agent, or Firm*—Don Finkelstein

(57) ABSTRACT

A water hydration system for providing clean, fresh drinking water for animals and emptying the old water from which the animals had been drinking on a predetermined sequence and schedule.

24 Claims, 28 Drawing Sheets

HYDRATION SYSTEM FOR ANIMALS

BACKGROUND OF THE INVENTION

1. Field of the Invention

This invention relates to the drinking water systems for animals and more particularly to a system for selectively providing clean fresh water to an animal's drinking bowl for the animal to drink and selectively causing the discharge of old water and any accumulated debris therein from the drinking bowl either through manual control or automatically in accordance with a predetermined schedule.

2. Description of the Prior Art

There have heretofore been may devices proposed for automatically providing water and/or solid food into a bowl or dish for consumption by animals such as pet dogs, cats or the like. Many of such devices provided the water and/or solid food on a timed bases. However, often debris from the animals would accumulate in the water contained in the water or feed bowl and such debris also often would adhere to the surface of the feed bowl. Attempts suggested by the prior art devices for periodically removing the water and debris and replenishing the water with clean fresh water have not proven to be completely satisfactory. It has been found that debris floating on top of the water or dispersed throughout the water as well as resting on the bottom of the feed bowl and/or adhering to the walls of the feed bowl were not always completely removed during periodic automatic cleaning and replenishing cycles. Some of the prior art automatic water replenishing devices relied upon the normal movement of the water during the discharge of the water from the bowl. However, such normal movement, for example by the natural vortex by the Coriolis effect of the earth's rotation was not strong enough to cause a more complete removal of all debris in the water. That is, the comparatively weak Coriolis vortex did not provide a sufficiently strong vortex to remove all the debris and, additionally, such Coriolis vortex only lasted as long as the water was draining. No provisions had been provided for introducing water into the feed dish simultaneously with the water being drained out and inducing a forced vortex, much stronger than the weak Coriolis vortex, and continuing the simultaneous draining of the vortex swirling water for any desired time interval while the fresh water was being fed into the feed dish and the cycle repeated as often as desired.

Accordingly, there has long been a need for a drinking bowl arrangement for animals in which fresh water may be selectively automatically provided to the animal's drinking bowl and in which the old water therein and any accumulated debris is simultaneously discharged.

It is another object of the present invention to provide periodic introduction of fresh, clean water into an animal's water bowl simultaneously with the discharge of the waste water therein from which the animal had been drinking.

It is another object of the present invention to provide periodic introduction of fresh, clean water into an animal's water bowl simultaneously with the discharge of the waste water therein from which the animal had been drinking on a cyclical, periodic timed interval.

It is yet another object of the present invention to provide periodic introduction of fresh, clean water into an animal's water bowl simultaneously with the discharge of the waste water therein from which the animal had been drinking which cycle may be automatically or manually controlled.

It is another object of the present invention to provide periodic introduction of fresh, clean water into an animal's water bowl simultaneously with the discharge of the waste water therein from which the animal had been drinking and in which the water in the water bowl is rotated by a forced vortex.

It is another object of the present invention to provide periodic introduction of fresh, clean water into an animal's water bowl simultaneously with the discharge of the waste water therein from which the animal had been drinking and which may be placed in remote locations and sized to accommodate the drinking habits of farm or other animals which may be larger than conventional household pets such as dogs or cats.

It is yet another object of the present invention to provide periodic introduction of fresh, clean water into an animal's water bowl simultaneously with the discharge of the waste water therein from which the animal had been drinking and which is readily adaptable for use in zoos or the like for both animals and birds.

It is another object of the present invention to provide periodic introduction of fresh, clean water into an animal's water bowl simultaneously with the discharge of the waste water therein from which the animal had been drinking and in which the component parts may be quickly and easily separated for more intensive cleaning of the parts.

SUMMARY OF THE INVENTION

The above and other objects of the present invention are achieved, in a preferred embodiment thereof, by providing a nested, double bowl arrangement. The nested, double bowl arrangement has a bowl shaped inner bowl and a bowl shaped outer bowl. The inner bowl is positioned inside the outer bowl. Each of the inner bowl and the outer bowl have outside surfaces and inside surfaces and the inside surfaces of the outer bowl and inner bowl are in opposed relationship to each other and spaced a preselected distance apart. The preselected distance between the inside surface of the outer bowl and the inside surface of the inner bowl define a waste discharge volume. The outside surface of the inner bowl defines the hydration volume from which the animal may drink the fresh water that is selectively provided therein. Both the inner bowl and the outer bowl have an upper rim edge and a lower rim edge. The lower rim edge of the outer bowl and the lower rim edge of the inner bowl each define a bottom opening extending through the wall of the respective bowl. In the preferred embodiment of the present invention the upper rim edges and the lower rim edges of the inner bowl and the outer bowl are generally circular in shape and concentrically mounted about a central axis. Other geometric shapes may be utilized as desired for particular applications. The area defined by the upper rim edges of the inner bowl and the outer bowl are greater than the area defined by the lower rim edges of the inner bowl and the outer bowl.

The lower rim edge of the inner bowl and the lower rim edge of the outer bowl are in close proximity to each other and sealed from each other to prevent leakage of the waste discharge water from the waste discharge volume. A top edge member is provided between the upper rim edge of the inner bowl and the upper rim edge of the outer bowl for coupling the upper edges together. The top edge member may be a separately fabricated structure suitably coupled to each of the upper rim edge of the outer bowl and the upper rim edge of the inner bowl and, in preferred embodiments of the present invention, removably coupled to at least one of the upper rim edges of the inner bowl and the outer bowl to allow for separation of the inner bowl from the outer bowl for periodic cleaning and maintenance of the inside surfaces of the inner bowl and the outer bowl. In the first preferred embodiment of the present invention the top edge member is unitarily fabricated with the inner bowl. The upper rim edge of the inner bowl has an upstanding arcuate portion therearound.

The top edge member has a generally planar annular portion which is connected to the inner bowl below the top of the upstanding arcuate portion of the upper rim edge of the inner bowl and the annular portion has water flow passages therethrough which provide communication with the waste discharge volume so that waste water and accumulated debris that may flow onto the annular portion can flow into the waste discharge volume. The top edge member has an outer raised upstanding arcuate portion and the top of the outer raised upstanding arcuate portion is, in preferred embodiments of the present invention, above the annular portion of the top edge member and above the top of the upstanding arcuate portion of the upper rim edge of the inner bowl.

The inner bowl is provided with a plurality of water drain flow passages in spaced relationship around the periphery of the inner bowl and adjacent the upper rim edge and below the connection of the top edge member to the inner bowl. The water flow passages provide communication between the hydration volume and the waste discharge volume so that water and any accumulated debris in the hydration volume can flow therefrom and into the waste discharge volume.

A plurality of fins may be mounted on the inner surface of the outer bowl to aid in defining fluid channels down the waste discharge volume and may also bear against the inside surface of the inner bowl to aid in maintaining the separation between the inner surface of the outer bowl and inner surface of the inner bowl. The fins are preferably located in regions adjacent the lower rim edge of the outer bowl and extend therefrom towards the upper rim edge of the outer bowl. Additionally, the outer bowl may be provided with a plurality of channels extending from regions adjacent the upper rim edge of the outer bowl towards the plurality of fins. Both the plurality of fins and the plurality of channels are each in a preselected spaced relationship around the inside surface of the outer bowl. The upper rim edge of the outer bowl may be provided with walls defining an outwardly extending flange or shoulder for engagement with the top edge member.

A water flow manifold is positioned in the bottom openings of the lower rim edges of the inner bowl and the outer bowl and has a first portion outside the outer surface of the outer bowl, a second portion in the waste discharge volume and between the lower rim edge of the outer bowl and the lower rim edge of the inner bowl and a third portion in the water hydration volume of the inner bowl. The water flow manifold has an inlet water aperture extending therethrough from the first portion through the second portion and through the third portion. The first portion may be connected by an appropriate water inlet conduit to a conventional fresh water supply such as municipal water supplies which generally have a water pressure on the order of 40 psi to 80 psi. Alternatively, if desired or required, an inlet water pump may be provided in the water inlet conduit between a fresh water supply, for example such as a lake, river or the like, and the lower portion of the water flow manifold. In all embodiments, the water so supplied flows through the water flow manifold and into the water hydration volume to fill the water hydration volume to provide the fresh water for the animal to drink The second portion of the water flow manifold is provided with an annular flange having an upper surface and a lower surface. The lower surface of the flange of the water flow manifold has a plurality of fin-like members extending therefrom to define waste water discharge flow paths therebetween. The inside surface of the lower rim edge of the outer bowl engages the fin-like members to complete the waste water discharge flow paths.

A discharge water cup is mounted on the first portion of water flow manifold and has first walls abutting the outer surface of the lower rim edge of the outer bowl to clamp the lower rim edge of the outer bowl between the fin-like members of the water flow manifold and the first walls of the discharge water cup. A seal is provided adjacent the first walls of the discharge water cup and also bears against the outer surface of the lower rim edge of the outer bowl to provide a seal therebetween. The discharge water cup has second walls defining an annular waste water accumulator volume for receiving waste water and debris flowing from the water discharge flow paths. A discharge port is connected to the annular waste water accumulator to which a water discharge conduit may be connected to direct the waste water and accumulated debris therein to a suitable drain.

The lower rim edge of the inner bowl is provided with a downwardly extending lip portion on the outside surface thereof and the lip portion extends downwardly to engage the upper surface of the annular flange on the water flow manifold. A seal may be provided between the lip portion and the water flow manifold to provide a water tight seal therebetween. The seal may, for example, be an "O" ring seal. The water flow manifold has a generally planar disc shaped section in the third portion and the disc shaped section is positioned in the lip of the inner bowl. The disc shaped section has a peripheral wall engaging the lip portion and has first walls defining a plurality of tab receiving notches therein in spaced relationship therearound. The lip portion of the inner bowl has a plurality of tabs thereon which are removably positioned in the tab receiving notches and such engagement prevents relative rotational movement between the inner bowl and the water flow manifold. Slots may be provided in the peripheral wall adjacent the tab receiving notches for receiving the tabs therein to removably hold the tabs in position on the water flow manifold. The tabs may be positioned in the slots by a small degree of relative rotation between the inner bowl and the water flow manifold. The disc shaped section of the water flow manifold is also provided with walls defining a plurality of leg accepting apertures therein spaced inwardly from the peripheral wall and arranged in a spaced apart relationship and the disc shaped section has an interior face in the water hydration volume.

A vortex cap is positioned on the water flow manifold and has an outer peripheral wall surface, a dome shaped top portion and an annular peripheral wall portion having a lower surface abutting the interior face of the water flow manifold. The vortex cap has a plurality of legs extending downwardly from regions adjacent the peripheral wall and the legs are insertable into the leg receiving apertures in the disc shaped section of the water flow manifold. The legs are inserted into the leg receiving apertures so that the abutment between the lower surface of the peripheral wall portion of the vortex cap and the interior face of the water flow manifold is maintained.

The volume between the interior face of the disc like portion of the water flow manifold and the dome shaped top portion of the vortex cap is a plenum chamber for receiving water from the water inlet water aperture passage. The vortex cap overlies the inlet water aperture in the third portion of the water flow manifold so that water entering the inlet water aperture fills the plenum chamber and impinges on the inner face of the vortex cap. The annular peripheral wall portion of the vortex cap is provided with walls defining a plurality of vortex slots having a first end in water receiving relationship to the plenum chamber and the vortex slots define water passageways for the water to exit the slots into the water hydration volume in regions adjacent the peripheral wall of the vortex cap. The vortex slots are oriented at a preselected forced vortex inducing angle in the water hydration volume. The preselected forced vortex inducing angle of the vortex slots is selected, in a preferred embodiment of the present invention, to be close to tangential to the peripheral wall of the vortex cap so that water flowing through the vortex slots both fills the water hydration volume and induces a forced vortex rotational movement of the water in the water hydration volume about the central axis. The preselected forced vortex inducing angle of the vortex slots is dependent upon several factors in the design of the hydration system of the present invention such as the water pressure, the geometry of the inner bowl, the size of the slots and the like.

In the preferred embodiments of the present invention the vortex cap is also provided with a plurality of spaced apart water jet apertures in the dome shaped top portion for directing water from the vortex cap upwardly into the water hydration volume in regions adjacent the central axis to insure that there is water in the center of the forced vortex.

The discharge water cup is provided with walls defining an annular center opening for mounting on the first portion of the water flow manifold that is external the outer surface of the outer bowl. In preferred embodiments of the present invention the mounting between the discharge water cup and the first portion of the water flow manifold is a threaded engagement therebetween and tightening the discharge water cup clamps the lower rim edge of the outer bowl onto the ribs on the lower surface of the flange on the second portion of the water flow manifold. A seal, such as an "O" ring seal, may be provided on the external surface of the first portion of the water flow manifold for sealing relationship with the discharge water cup to prevent any inlet water leaking therefrom.

To aid in preventing relative rotation between the outer bowl and the water flow manifold there may provided extensions on one or more of the fin-like members on the lower surface of the annular flange on the second portion of the water flow manifold. Matching rib extension accepting slots are provided on the lower rim edge of the outer bowl so that the extensions fit therein to resist relative rotational movement between the water flow manifold and the outer bowl.

A base may be attached to the outside surface of the outer bowl for supporting the arrangement on the ground in any desired location where there is an available fresh water supply for connection to the fresh water inlet conduit and a drain for connection to the discharge water conduit. In some applications of the present invention, such as at remote field locations for providing fresh drinking water to, for example, farm animals, the waste water and accumulated debris therein may be allowed to flow on the ground in locations near the location of the hydration system.

The operation of the hydration system of the present invention is achieved in the preferred embodiments by providing a valve in the water inlet conduit which has an open position for allowing water to flow therethrough and a closed position for preventing water from flowing therethrough. The valve in the water inlet conduit may be manually controlled or automatically controlled by, for example, the valve being an electrically operated, normally closed solenoid valve and a timer circuit connected thereto which provides electrical energy to the solenoid valve to cause it to open for a predetermined time period on a preselected schedule. For the condition of the fresh water flowing into the water flow manifold the water exiting the slots in the vortex cap causes a forced vortex rotation of the water in the water hydration volume. The forced vortex is very much greater and stronger than the natural vortex arising from draining a fluid container caused by the Coriolis effect of the earth's rotation on the draining body of water. The forced vortex exerts a scrubbing action on the inside surface of the inner bowl to dislodge any debris that may be adhering thereto and such debris as well as the debris that may be floating in the water in the water hydration volume and debris that may be at or resting on the inside surface of the lower rim edge of the inner bowl to swirl with the water and make, essentially a slurry mixture therewith. As the water hydration volume is filled with the fresh water, the vortex spinning water approaches the upper rim edge of the inner bowl and flows out of the water drain flow passages and into the waste discharge volume and thus flows through the discharge water conduit to regions external thereof. For water flowing over the top of the arcuate portion of the upper rim edge of the inner bowl and onto the annular portion of the top edge member, such water and any debris therein flows through the water flow apertures therein and into the waste discharge volume.

The solenoid valve in the inlet water conduit may be left on as long as desired until the water in the water hydration volume is clean and then the valve may be closed. The cycle is repeated as often as necessary for the particular animals drinking therefrom.

In some applications it may be desired to provide a solenoid valve or a manually operated valve in the discharge water conduit. Such valve in the discharge water conduit is operated at least partially synchronously with the valve in the inlet water conduit such that the valve in the discharge water conduit is open during the time that the valve in the inlet water conduit is open to ensure that the waste water flows out of the hydration system. If desired, the valve in the discharge water conduit may be closed or left open during other portions of the operating cycle. In those embodiments of the present invention where there are provided pumps in either or both the inlet and outlet water conduits, the pumps are appropriately operated by the timer system for the condition of water to be flowing therethrough.

In another preferred embodiment of the present invention there is provided a vortex cap having one or more water discharge tubes positioned adjacent the outside surface of the inner bowl and extending from the vortex cap to regions upwardly towards the upper rim edge of the inner bowl and may extend partially towards the upper rim edge of the inner bowl or all the way to the upper rim edge depending upon the particular configuration of the hydration system. The water discharge tubes have a first end at the vortex cap positioned to receive water from the plenum, chamber of the vortex cap. The water discharge tubes have a plurality of water jet apertures therein in spaced apart relationship along the axial length thereof for discharging water therefrom into the water hydration volume at a preselected vortex inducing angle to induce the forced vortex of water contained therein.

In other preferred embodiments of the present invention, other configurations of water discharge tubes may be positioned in the water hydration volume and receive water from the plenum chamber of the vortex cap and discharge the water through one or more water jet discharge apertures which are oriented in a forced vortex inducing angle to induce the forced vortex of water contained in the water hydration volume.

BRIEF DESCRIPTION OF THE DRAWING

The above and other embodiments of the present invention my be more fully understood from the following detailed description taken together with the accompanying drawing wherein similar reference characters refer to similar elements throughout and in which.

DESCRIPTION OF THE PREFERRED EMBODIMENTS

Figure 1:
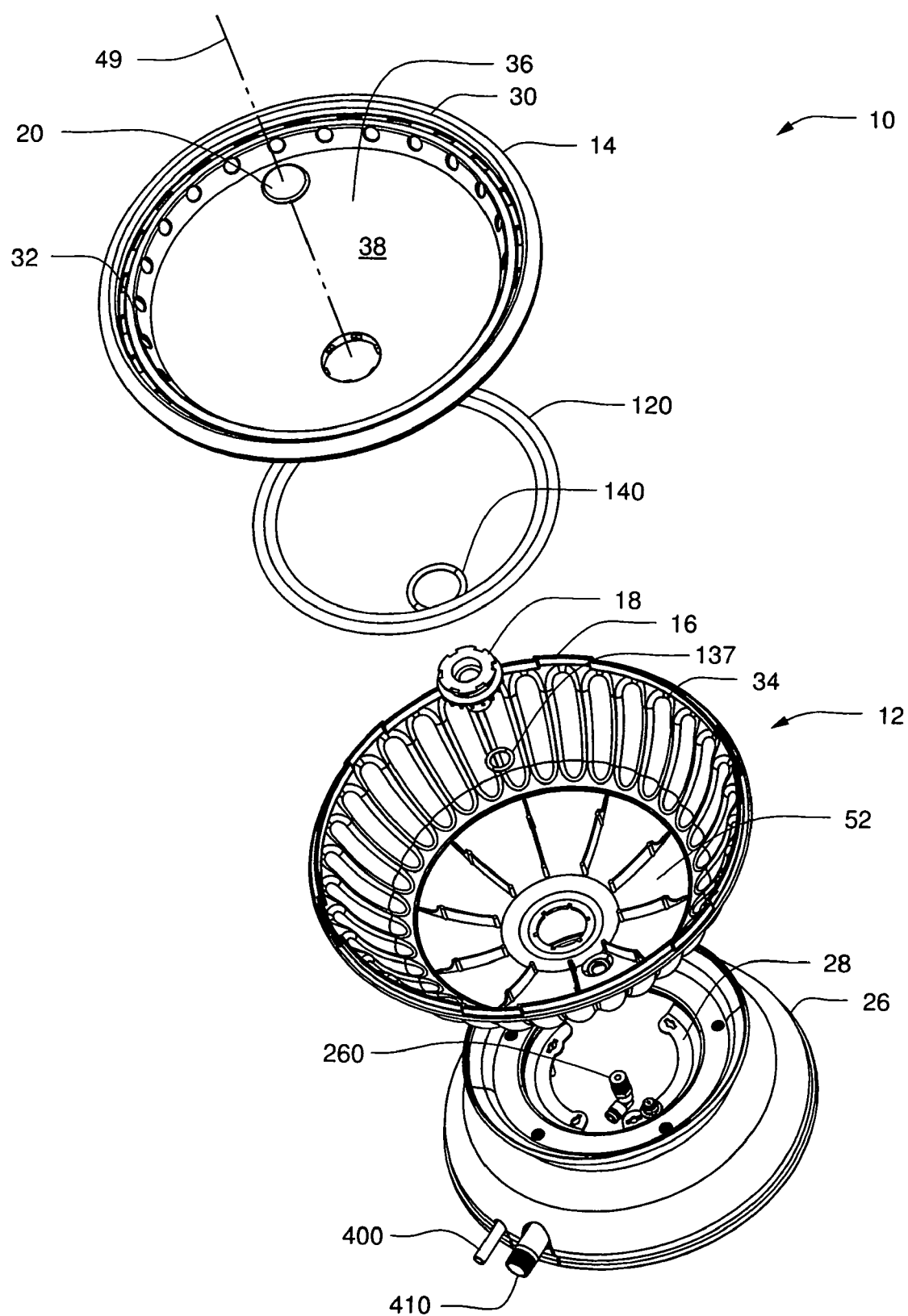
FIG. 1 is an isometric exploded view of a first preferred embodiment of the present invention.
Figure 2:
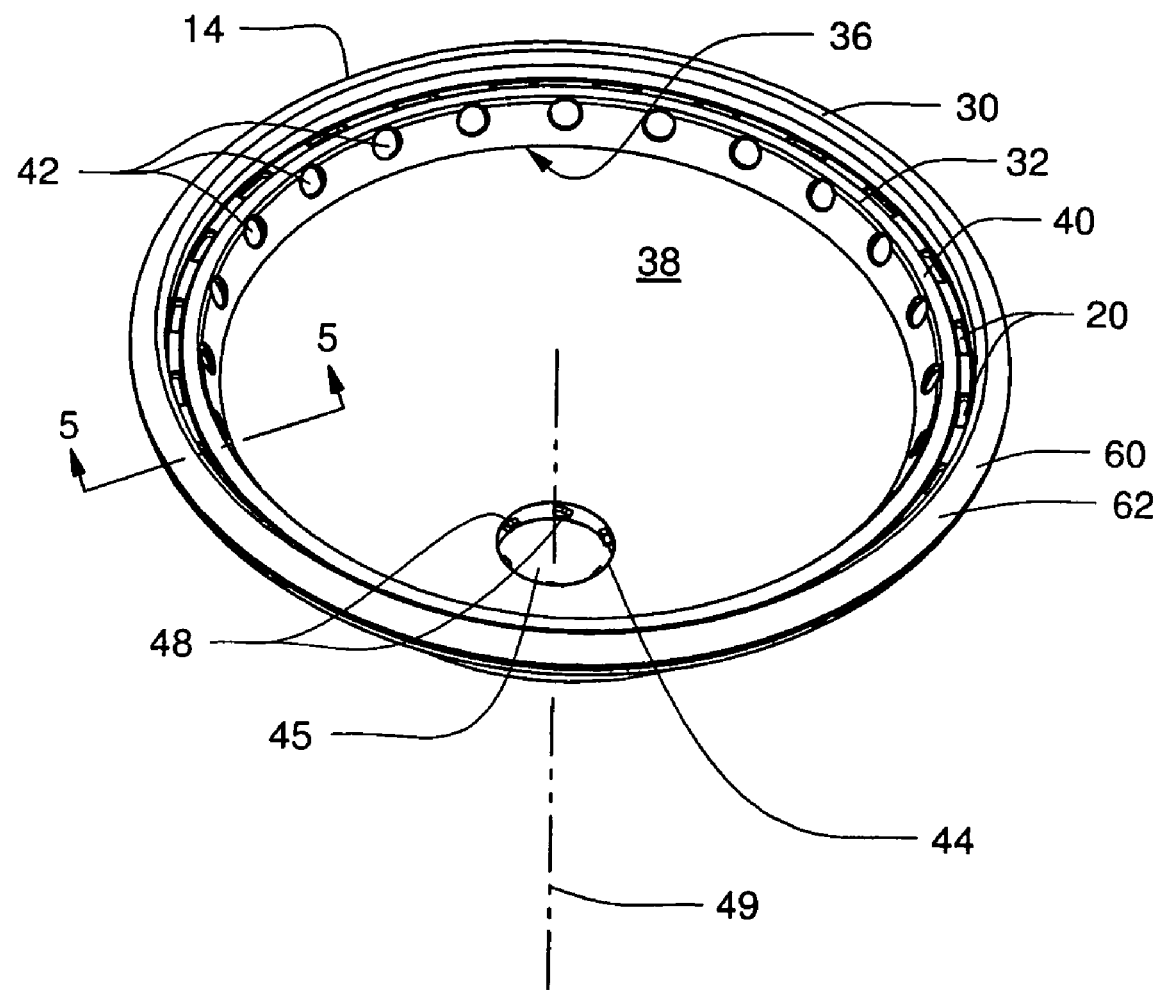
FIG. 2 is a top isometric view of an inner bowl useful in the practice of the present invention.
Figure 3:
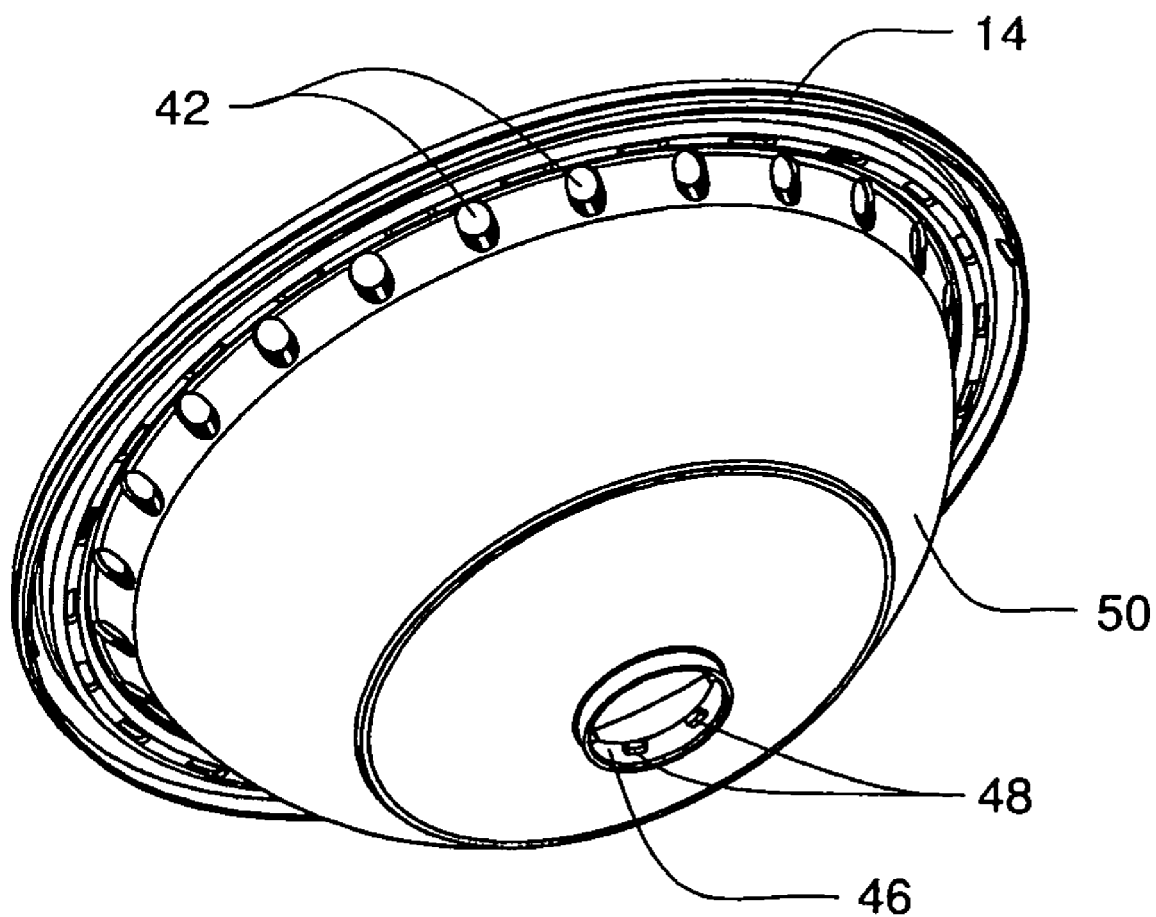
FIG. 3 a bottom isometric view of an inner bowl useful in the practice of the present invention.
Figure 4:
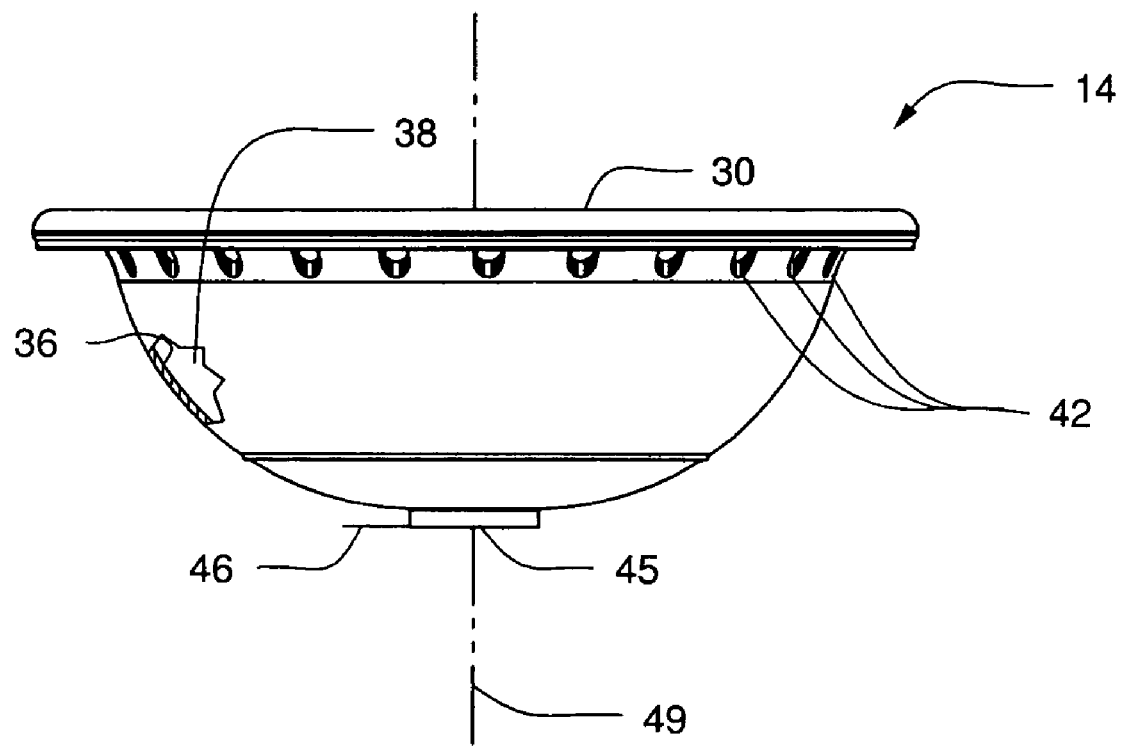
FIG. 4 is a side view of an inner bowl useful in the practice of the present invention.
Figure 5:
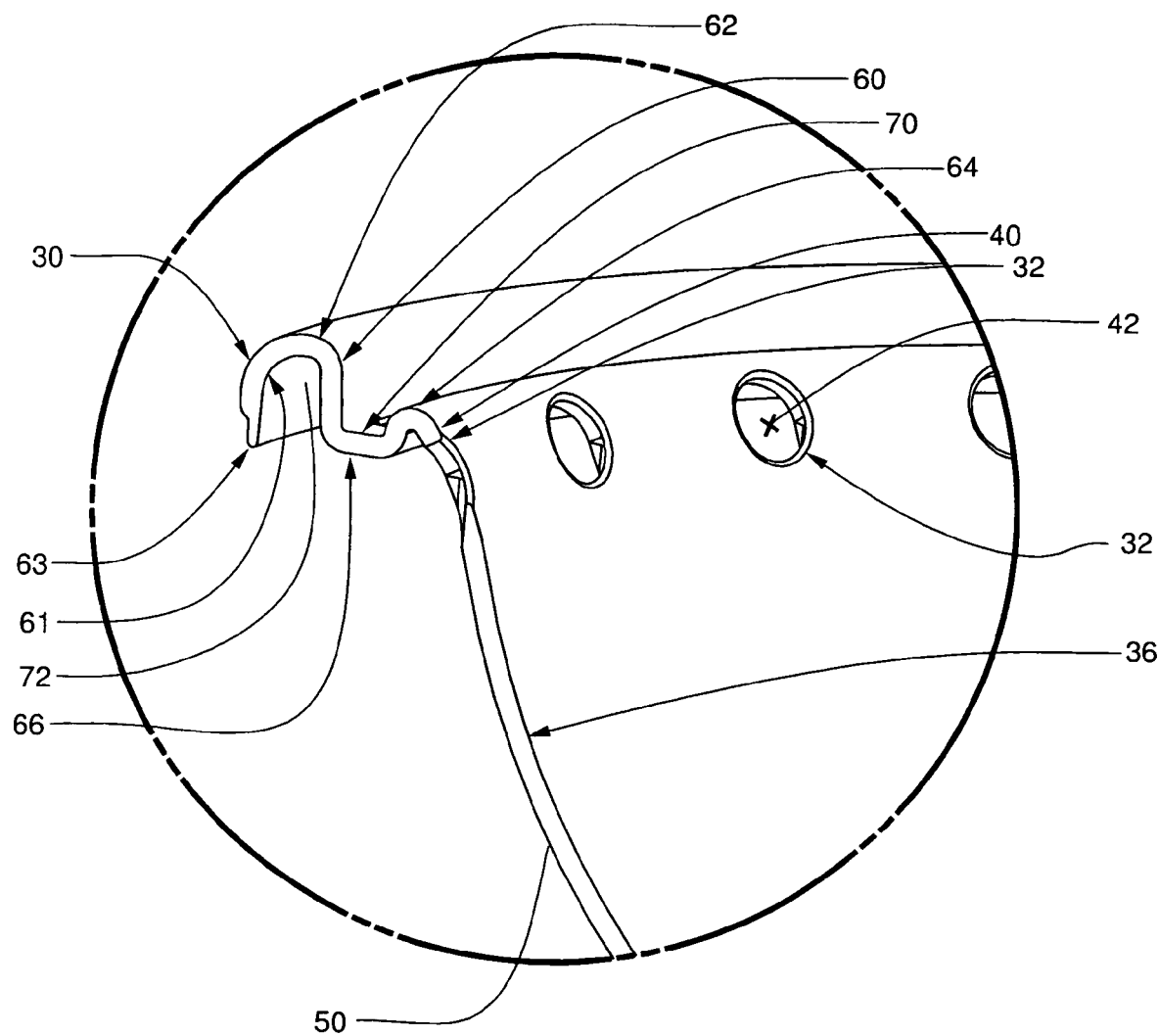
FIG. 5 is a partial sectional view of the top edge member and upper rim edge of the inner bowl useful in the practice of the present invention.
Figure 6:
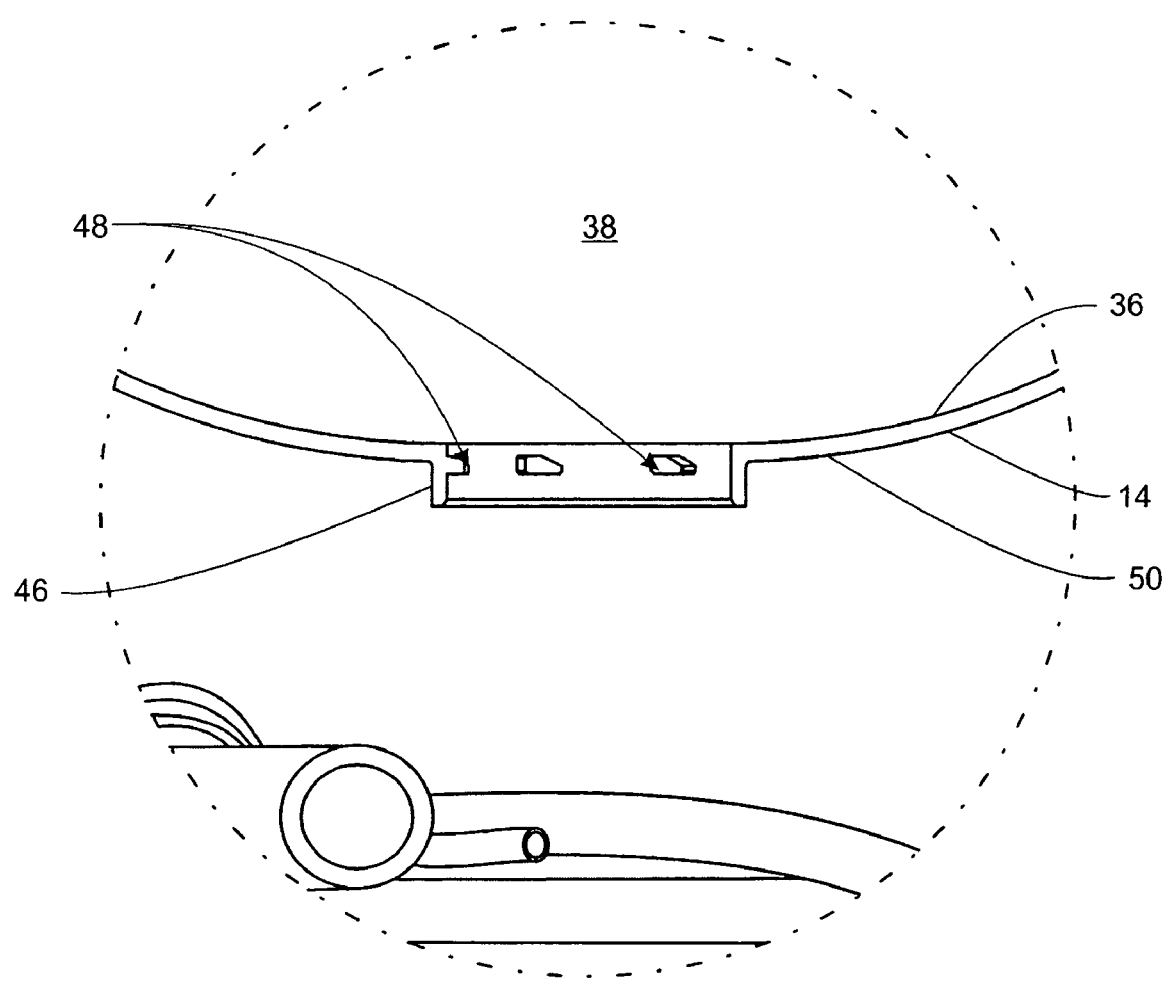
FIG. 6 is a partial sectional view of the lower rim edge of the inner bowl useful in the practice of the present invention.
Figure 7:
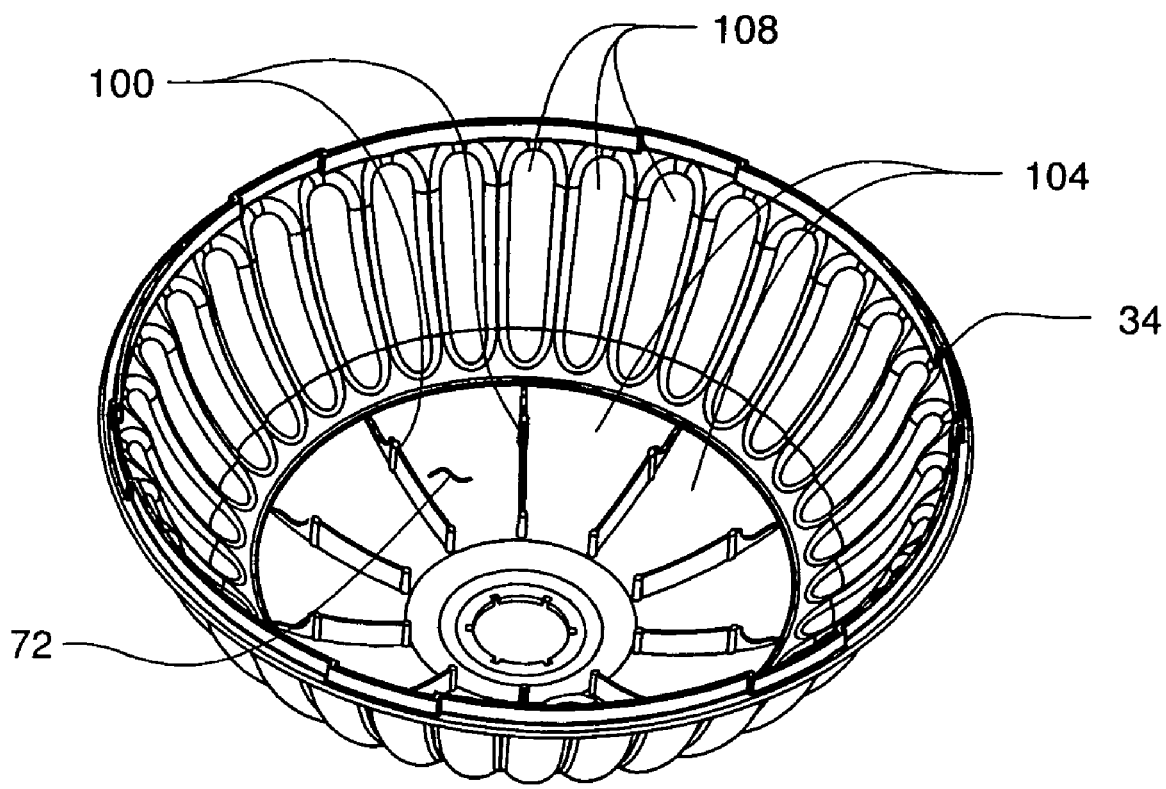
FIG. 7 is a top isometric view of an outer bowl useful in the practice of the present invention.
Figure 8:
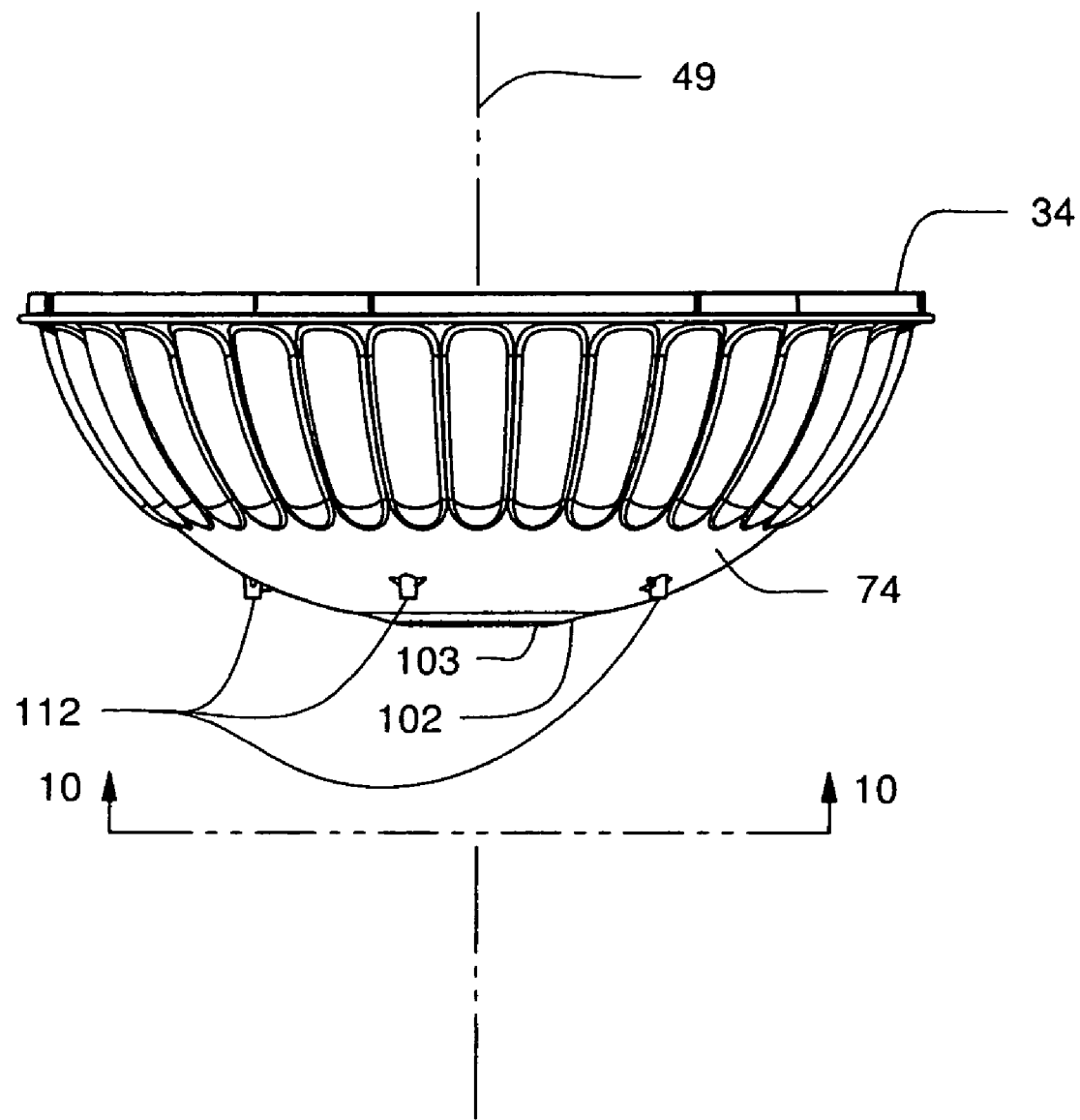
FIG. 8 is a side view of an outer bowl useful in the practice of the present invention.
Figure 9:
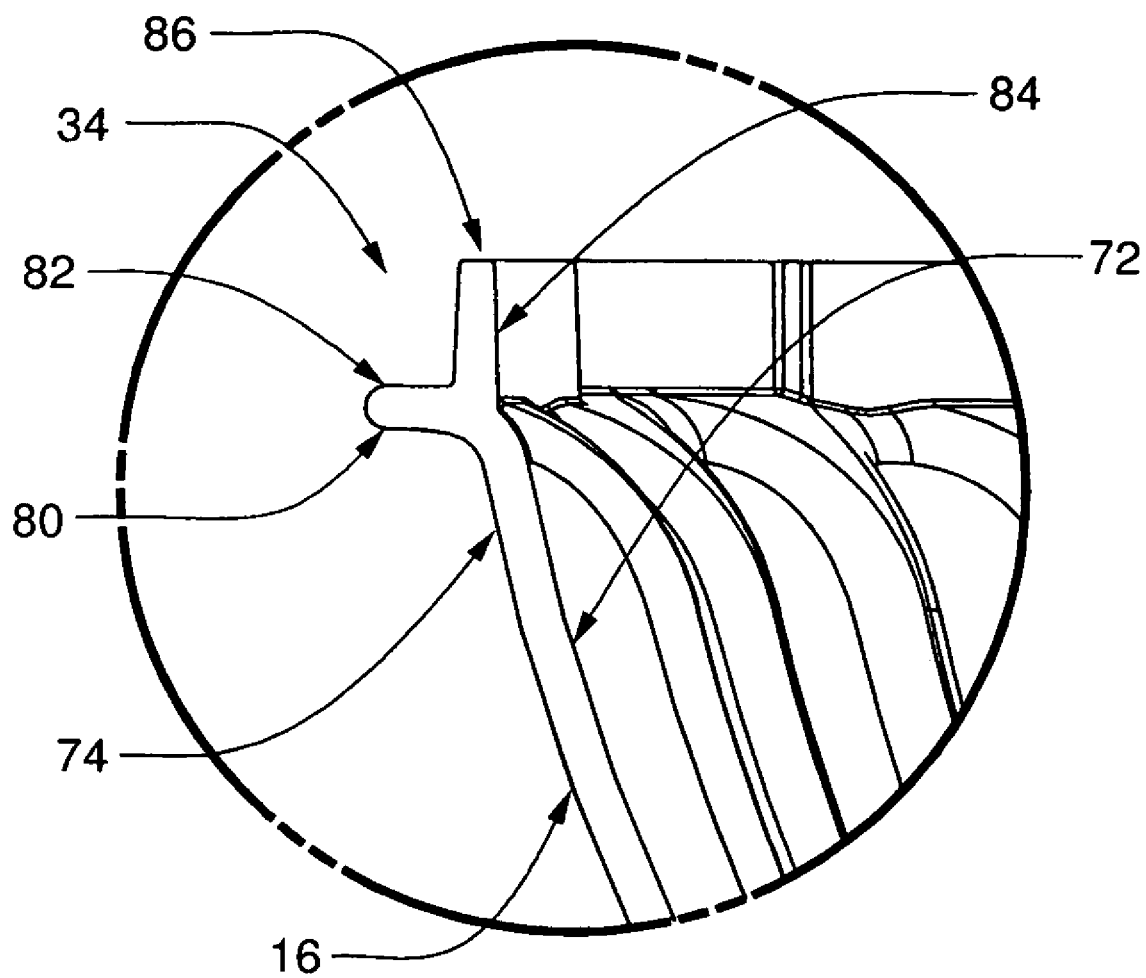
FIG. 9 is a partial sectional view of the upper rim edge an outer bowl useful in the practice of the present invention.

Referring now to the drawing, there is illustrated in FIGS. 1 through 28 a first preferred embodiment of the present invention generally designated 10. FIG. 1 is an exploded view of the water hydration system for animals, generally designated 12, and which has a nested bowl arrangement comprised of an inner bowl 14 and an outer bowl 16. The inner bowl 14 fits into the outer bowl 16. The water hydration system for animals 12 is also provided with a water flow manifold 18 and a vortex cap 20 which, when the embodiment 10 is assembled, fits on top of the water flow manifold. Seals 140 and 137 which are positioned on the water flow manifold 18 are provided to prevent leakage of water from the various flow paths and volumes of the embodiment 10. The space for the various connections for providing clean fresh water into the inner bowl 14 and draining the waste water are indicated in the volume 28 in base 26 where connections of the inlet water conduit 403 and discharge water conduit 410 are appropriately connected to the water hydration system 12. A discharge water cup 260 is provided in the volume 28 for connection to the discharge conduit 410 and to the water flow manifold 18.

A top edge member 30 is provided at the upper rim edge 32 of the inner bowl 14. In the embodiment 10 the top edge member 30 is unitarily formed with the inner bowl 14 and removably mounted on the upper rim edge 34 of outer bowl 16. In other embodiments of the present invention, the top edge member 30 may be separately fabricated and attached to the upper rim edge 30 of inner bowl 14 and the upper rim edge 34 of the outer bowl 16 preferably removably coupled to at least one of the inner bowl 14 and outer bowl 16. In other preferred embodiments of the present invention the top edge member 30 may be unitarily fabricated with the outer bowl 16 at the upper rim edge 34 thereof and then removably mounted on the upper rim edge 32 of inner bowl 14.

FIGS. 2 through 6 illustrate the details of the inner bowl 14 useful in the embodiment 10 of the present invention. The inner bowl 14 has an outside surface 36 defining a water hydration volume 38 which is periodically filled with clean fresh water for an animal to drink and periodically emptied of water and accumulated debris in the water as the clean fresh water is replenished in the water hydration volume 38. The upper rim edge 32 of the inner bowl 14 has an upstanding arcuate portion 40. A plurality of water drain flow passages 42 are provided in regions adjacent the upstanding arcuate portion 40 and space d toward the lower rim edge 44 of the inner bowl member 14 and are in a spaced relationship around the inner bowl member. The lower rim edge 44 is provided with a lip portion 46 and a plurality of tabs 48 are in the lip portion 46. In the embodiment 10 the upper rim edge 32 and lower rim edge 44 are circular and concentric about a central axis 49 and the upper rim edge 32 defines a first area that is greater than the area defined by the bottom opening 45 of the lower rim edge 44. The inner bowl 14 has an inner surface 50 which, when the inner bowl 14 is nested in the outer bowl 16 is in a spaced and opposed relationship to an inner surface 52 of the outer bowl 16 to define a waste discharge volume 54 therebetween. The inner bowl 14 is a thin walled bowl shaped structure as shown most clearly in FIG. 4.

As noted above, the top edge member 30 is fabricated unitarily with the inner bowl 14. As shown in the partial sectional view of FIG. 5, the top edge member 30 has an outer raised upstanding portion 60 and the top 62 of the outer raised upstanding portion 60 is above the top 64 of the annular portion 40 of the inner bowl 14. The top edge member 30 also has an annular portion 66 extending around the inner bowl 14 and the annular portion 66 that is below the top 64 of the upstanding arcuate portion 40 of the inner bowl 14 and below the top 62 of the outer raised upstanding arcuate portion 60 and is substantially planar in a plane that is perpendicular to the central axis 49. The annular portion 66 has a plurality of water flow passages 70 extending therethrough. The outer raised upstanding arcuate portion 60 of the top edge member 30 defines an outer bowl upper rim edge accepting cavity 72.

Figure 14:
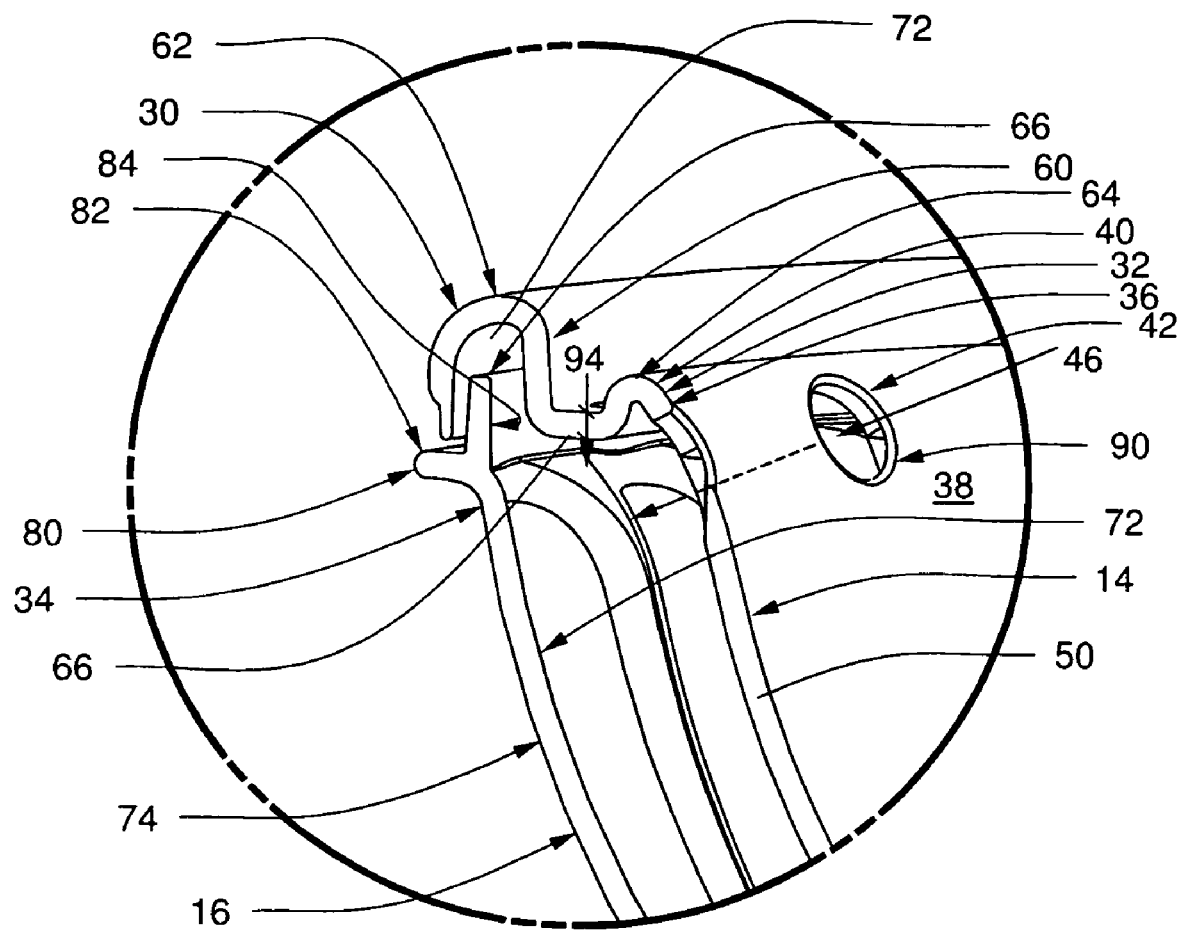
FIG. 14 illustrates the coupling of the upper rim edge of the inner bowl, the upper rim edge of the outer bowl and the top edge member in the first preferred embodiment of the present invention.
Figure 15:
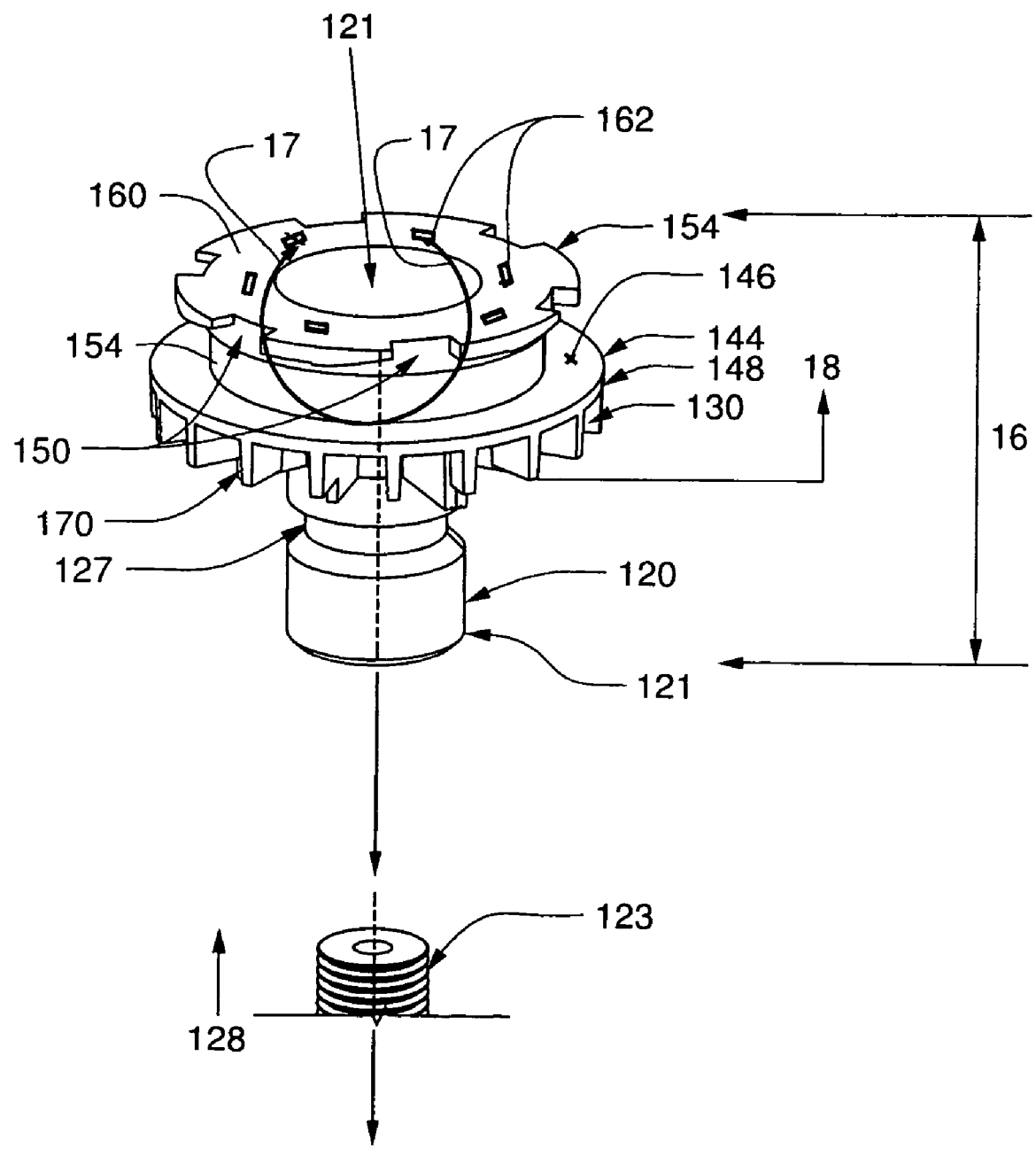
FIG. 15 is an isometric view of a water flow manifold useful in the practice of the present invention.

FIGS. 7 through 14 illustrate the outer bowl 16 useful in the preferred embodiment 10 of the present invention. The outer bowl 16 is a thin walled structure and has an inner surface 72 and an outer surface 74. The inside surface 72 of the outer bowl 16 defines a waste discharge volume 76 when mounted adjacent the inside surface 50 of the inner bowl 14. The outer bowl 16 has the upper rim edge 34 and the upper rim edge 34 is shown in detail in FIG. 9. As shown thereon, the upper rim edge 34 of outer bowl 16 is circular in configuration and has an outwardly directed ledge 80 having an upper surface 82 and an upwardly directed projection 84 having a top edge 86. The upper rim edge 34 of the inner bowl 16 is adapted to fit into the upper rim edge accepting cavity 72 of top edge member 30 as illustrated in FIG. 14 which, when so assembled, defines the waste discharge volume 76. The inside surface 61 of the outer raised upstanding arcuate portion 60 of the top edge member 30 rests on the top edge 85 of the upwardly directed projection 84 and the base surface 63 of the outer raised upstanding arcuate portion 60 rests on the upper surface 82 of the outwardly directed ledge 80 of the upper rim edge 34 of the outer bowl 16.

As shown on FIG. 14, water from the hydration volume 38 may travel in the direction of the arrow 90 through the plurality of drain flow passages 42 and into the waste discharge preferably 76. Also, any water spilling over the top 64 of the upstanding arcuate portion 40 of the upper rim edge 32 of the inner bowl 14 as indicated by the arrow 92 flows onto the annular portion 66 of the top edge member 40 and drains therefrom through the plurality of water flow passages 70 and into the waste discharge volume 76 as shown by the arrow 94.

The upper rim edge 34 and the lower rim edge 102 of the outer bowl 16 are circular in the embodiment 10 and concentric about the central axis 49. The upper rim edge 34 defines an area that is greater than the area defined by the lower rim edge 102. When the inner bowl 14 is mounted on the outer bowl 16, both the upper rim edges 30 and 34, respectively, and lower rim edges 44 and 102, respectively are substantially concentric about the central axis 49.

A plurality of upstanding fin members 100 are mounted on the inside surface 72 of the outer bowl 16. As shown in greater detail on FIG. 11, the plurality of fins 100 are preferably located in regions adjacent the lower rim edge 102 of the outer bowl 16 and extend upwardly towards the upper rim edge 34 to define a plurality of fluid channels 104 therebetween through which water may flow in the waste discharge volume 72 to the lower rim edge 102 and through the bottom opening 103 to regions external the outer bowl 16. The fins 100 may also bear against the inside wall 50 of the inner bowl 14 to help support the weight of the inner bowl 14 when filled with water in the water hydration volume 38. The outer bowl 16 may also be provided with a plurality of channels 108 on the inside surface 72 extending from regions adjacent the upper rim edge 34 towards the plurality of fins 100. The channels 108 also define water flow paths for aiding in directing water to flow from regions adjacent the top upper rim edge 34 to the channels 104 between the fins 100.

Figure 10:
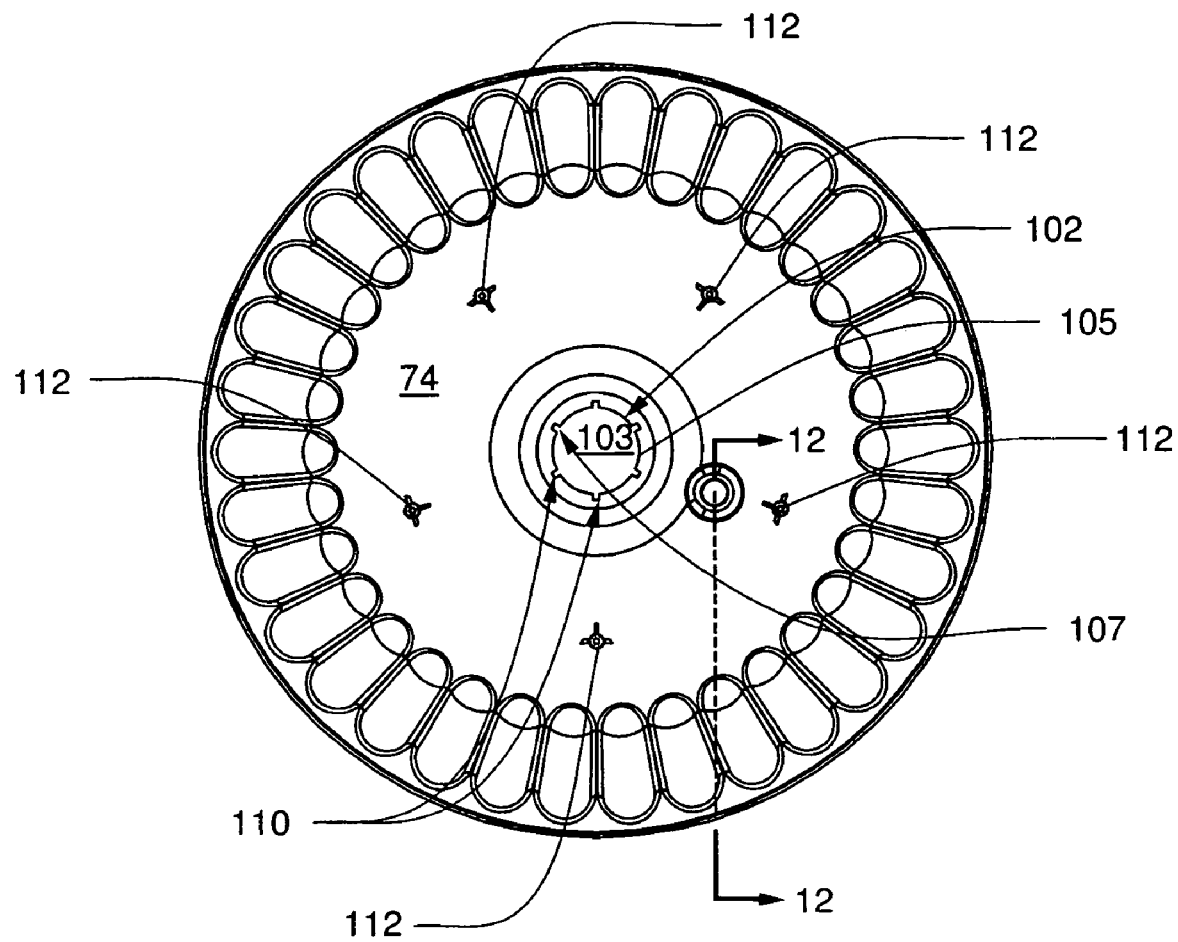
FIG. 10 is a partial bottom view of an outer bowl useful in the practice of the present invention showing the lower rim edge thereof.
Figure 11:
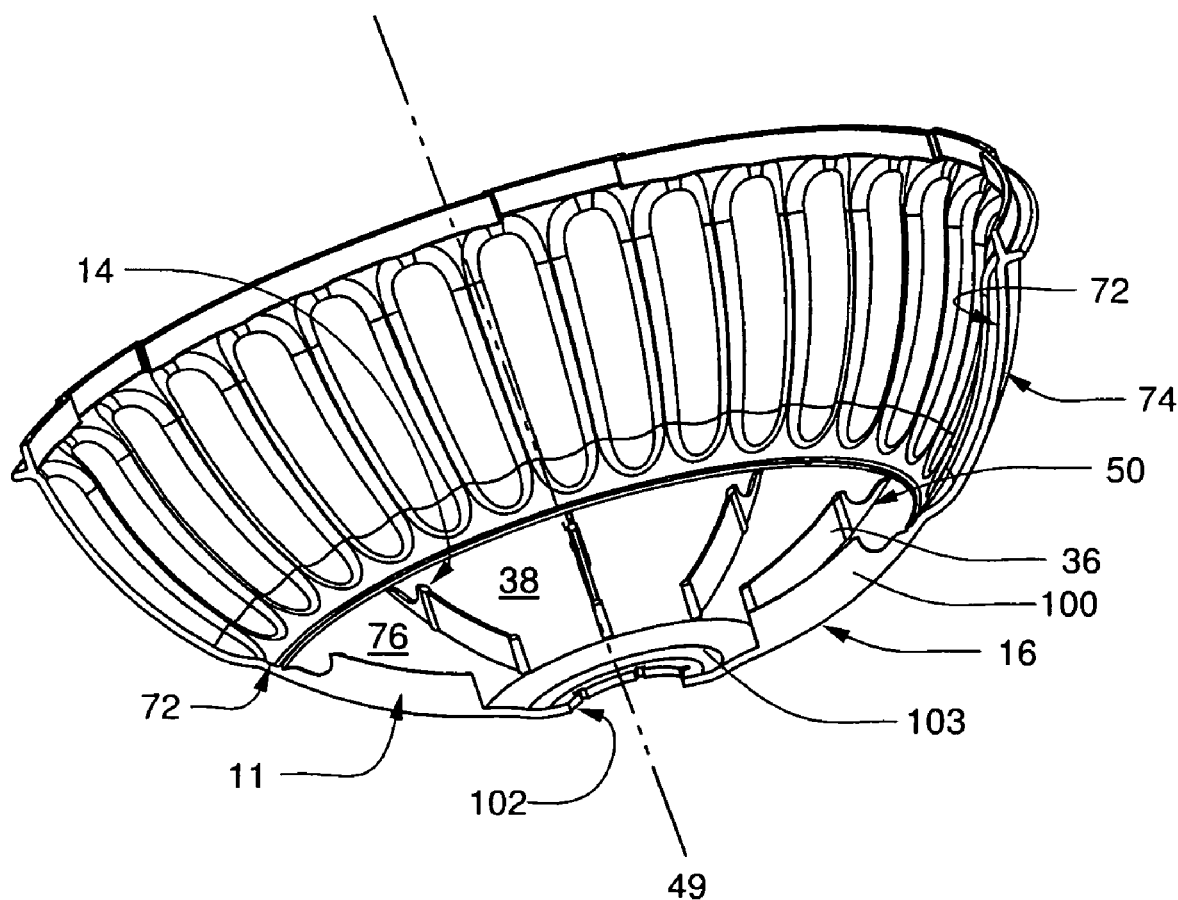
FIG. 11 is a partial sectional view of an outer bowl useful in the practice of the present invention showing the fins thereon.
Figure 12:
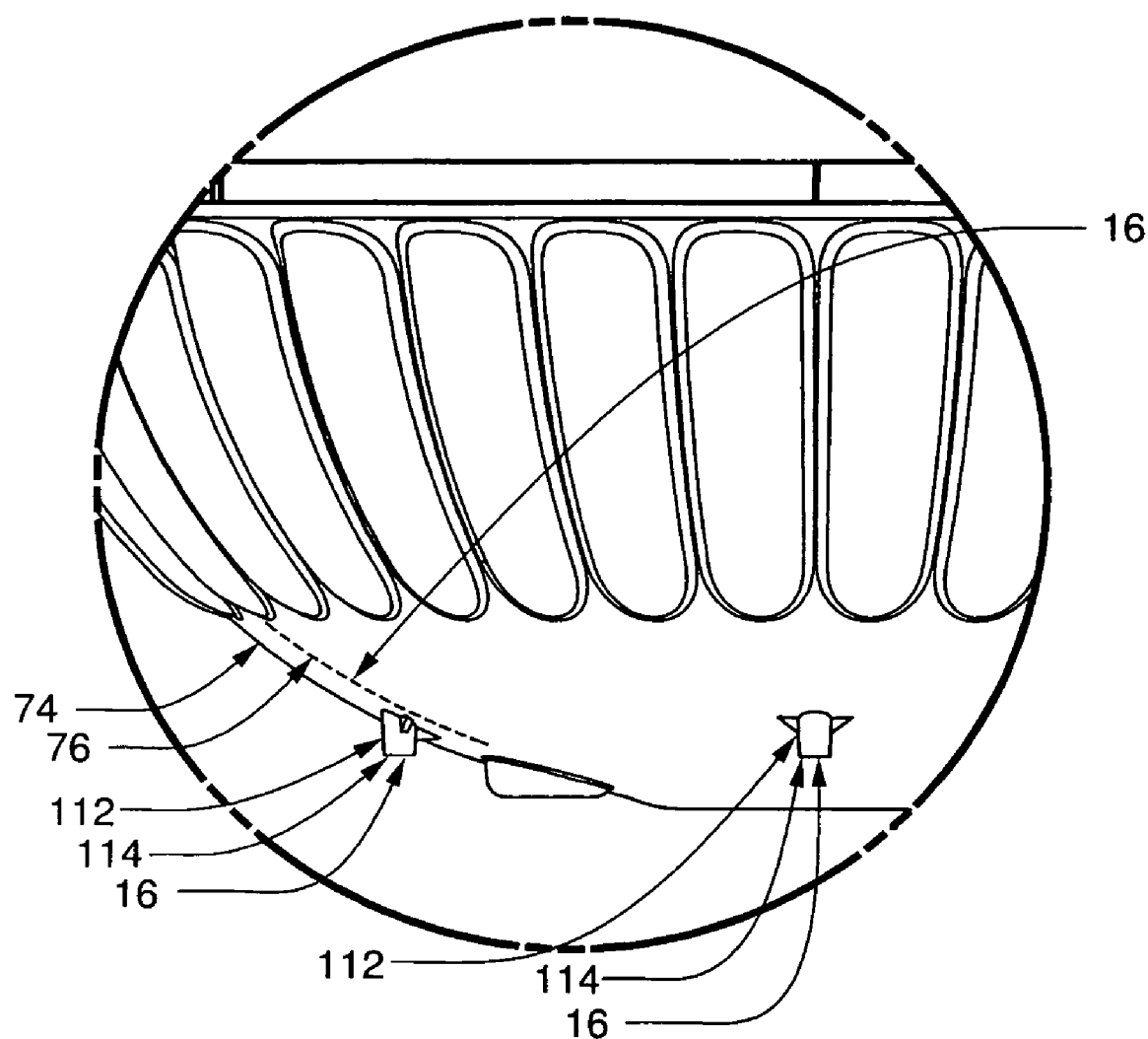
FIG. 12 is a partial sectional view of an outer bowl useful in the practice of the present invention showing the screw accepting bosses thereon.
Figure 13:
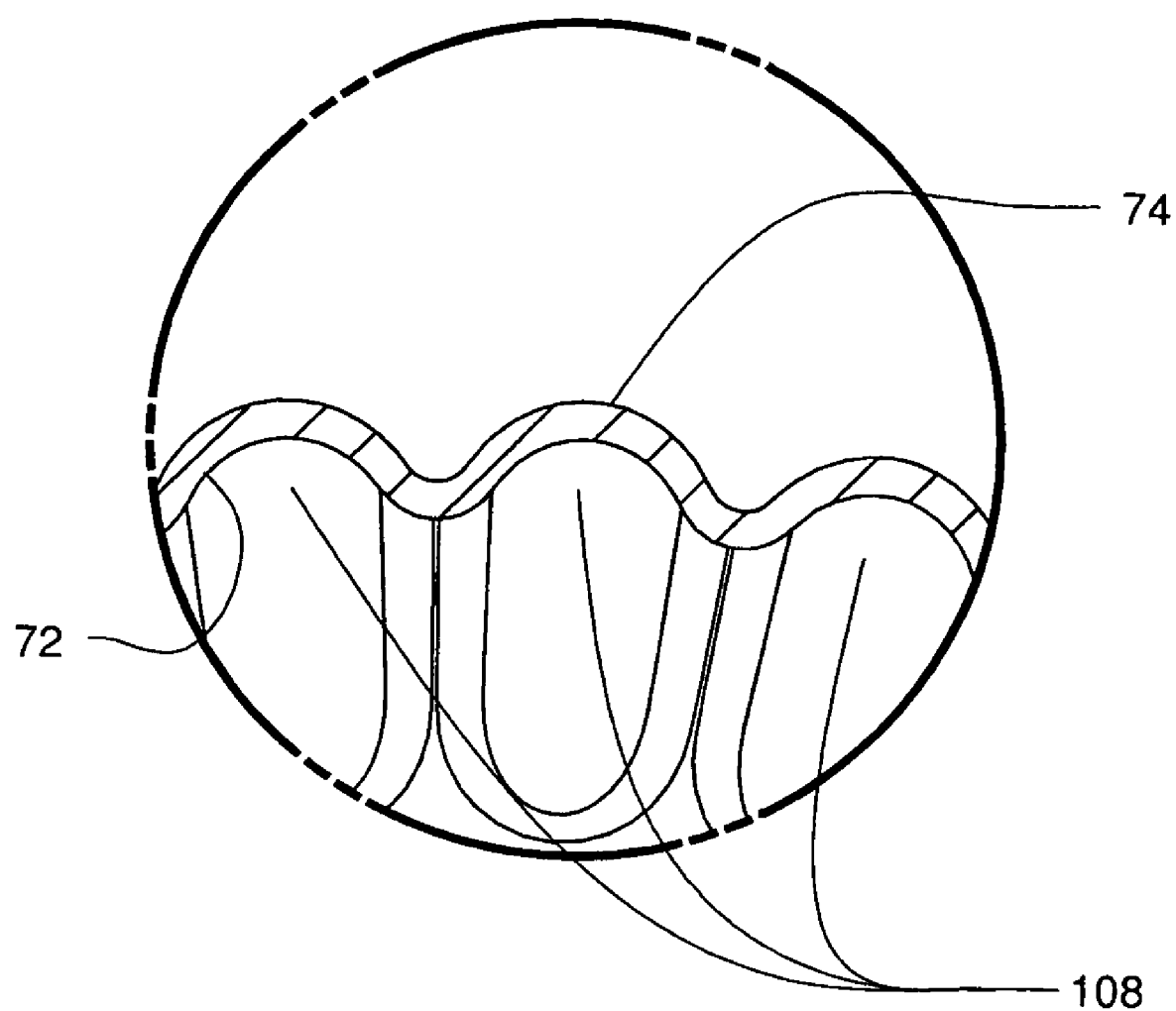
FIG. 13 is a partial sectional view of a portion of the side wall of the outer bowl 16 useful in the practice of the present invention.

As shown most clearly on FIG. 10, the walls 105 defining the lower rim edge 102 to provide the bottom opening 103 are also provided with walls 107 defining the notches 110 therein. While two such notches 110 are shown on FIG. 10, in some applications of the present invention there may be provided more than two such notches. A plurality of screw accepting bosses 112 are on the outside surface 74 of the outer bowl 16. The screw accepting bosses 112 have walls 114 defining the screw accepting aperture 116.

In some applications of the present invention it may be desirable or even required by local law, that debris in the water floating through the waste discharge volume 76 not be allowed to pass into the drain such as a sewer line or the like. in such applications, there may be provided a screen member 120 removably positioned in the waste discharge volume 76 against both the inside surface 36 of the outer bowl 14 and the inside surface 36 of the outer bowl 16 to catch any such prohibited debris. The screen 120 in such embodiments of the present invention may be periodically manually cleaned by removing the inner bowl 14 from the outer bowl 16 and manually cleaning accumulated debris from the screen 120.

The water flow manifold 18 connects the inner bowl 14 and outer bowl 16 and directs the flow of water into the hydration volume 38 of the inner bowl 14 and out of the waste discharge volume 76 of the outer bowl 16. The water flow manifold 18 has a first portion 120 that is positioned external the outside surface 74 of the outer bowl 16. The first portion 120 has a water flow aperture 121 that extends through the inlet water boss 122 along the central axis 49. The inlet water boss 122 has external threads 124 and, in the first portion, internal threads 126 adapted to threadingly receive a coupling nipple 123 or the like which may be connected to an inlet water conduit connected to a fresh water supply such as a municipal water supply, or the like. for conducting water into the water flow aperture 121 in the direction indicated by the arrow 128. The water flow manifold 18 has a second portion indicated at 130 that is in the waste discharge volume 76 of the outer bowl 16 and a third portion indicated at 132 that is in the water hydration volume 38 of the inner bowl 14. The water flow manifold 18 has walls 133 defining a first seal accepting groove 134 for receiving a seal therein such as the "O" ring 137 but other seal arrangements may be utilized as desired for particular applications. The water flow manifold 18 also has walls 135 defining a second seal accepting groove 138 for receiving a seal such as "O" ring 142 but other seal arrangements may be utilized as desired for particular applications. The water flow manifold 18 has a substantially planar annular shoulder 144 having an upper annular surface 146 which forms the lower surface of the second seal accepting groove 138 and a lower planar annular surface 148.

Figure 16:
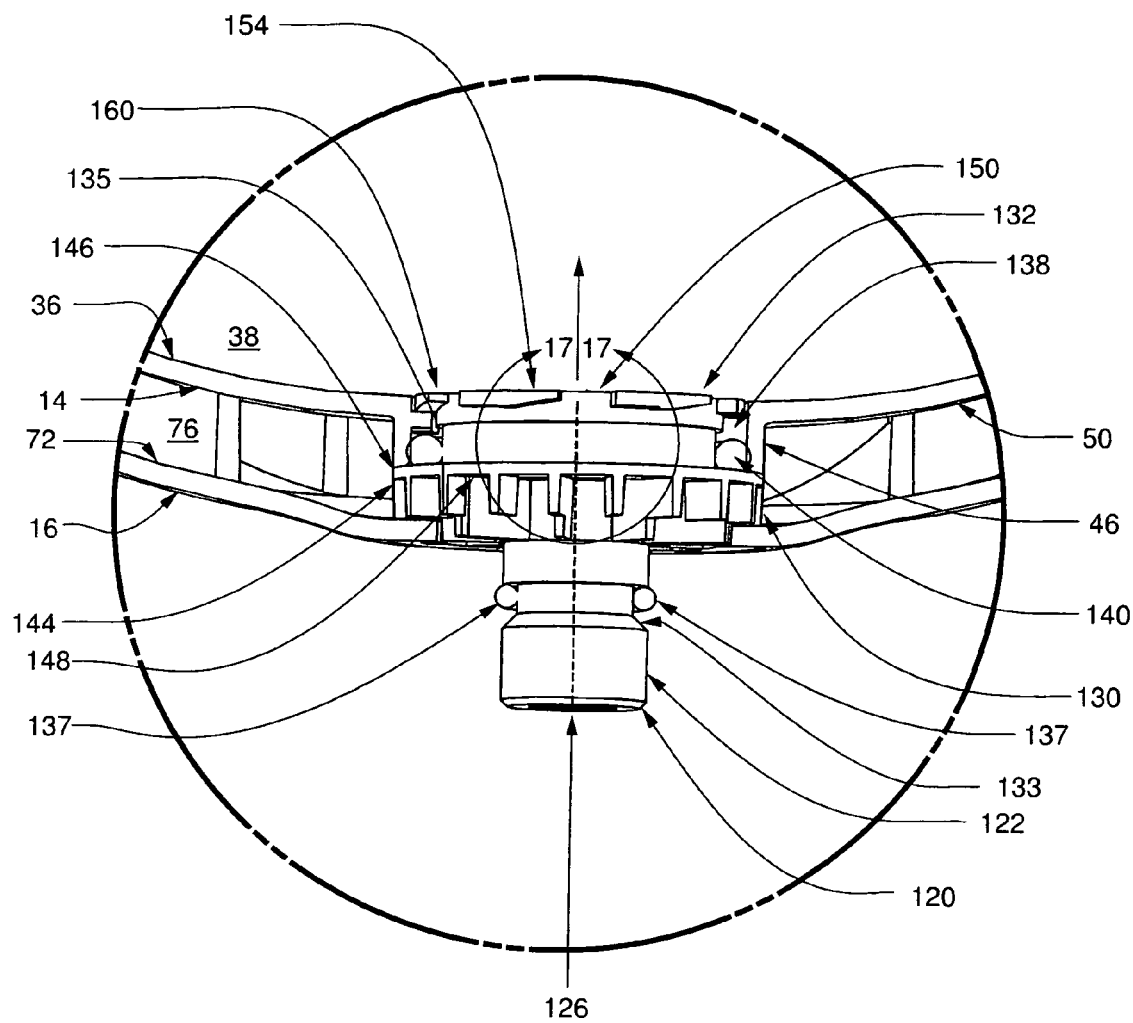
FIG. 16 is side view of the water flow manifold along the line 16-16 of FIG. 15.
Figure 17:
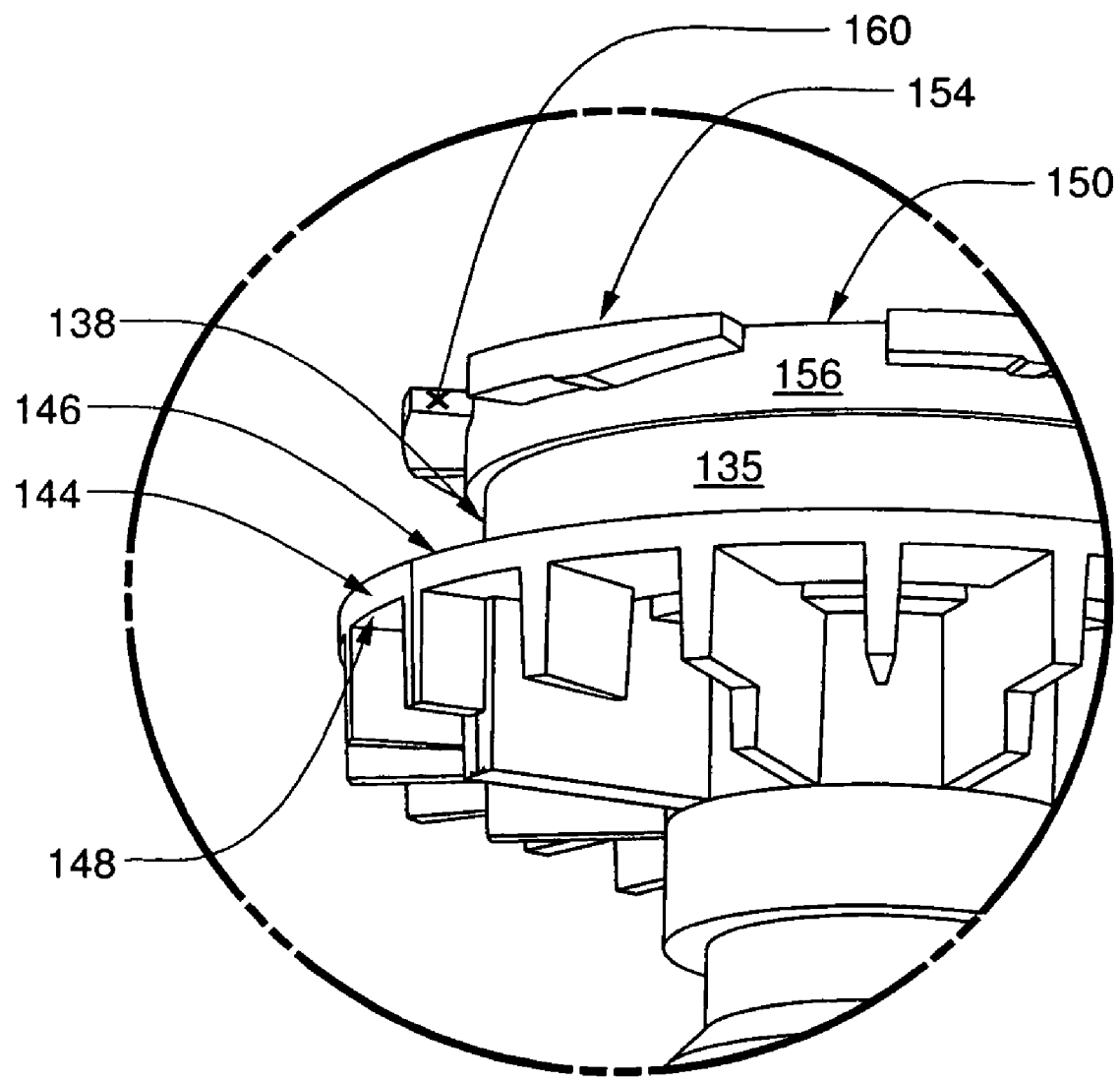
FIG. 17 is a detail view as indicated on FIG. 16 at 17-17.
Figure 18:
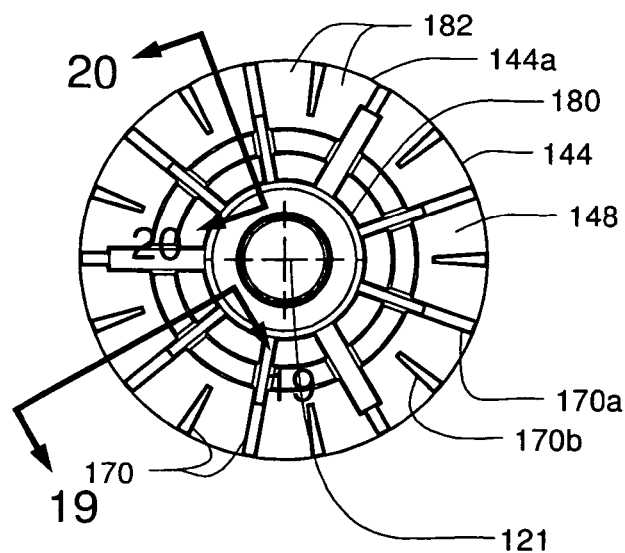
FIGS. 18, 19 and 20 illustrate detail structures of the water flow manifold of the preferred embodiment.
Figure 19:
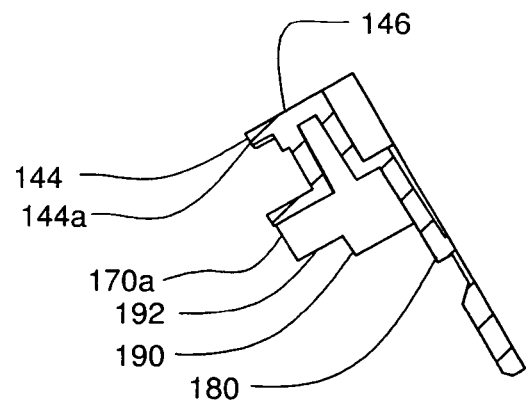
Figure 20:
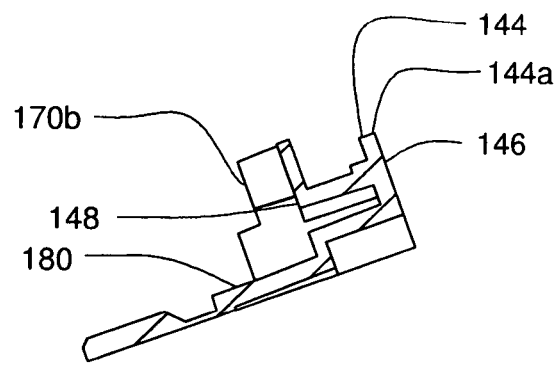

As shown on FIG. 16 the lip 46 of rests on the upper annular surface 146 of the substantially planar annular shoulder 144 and abuts the "O" ring 140. The plurality of tabs 48 of the lip portion 46 of the inner bowl 14 are inserted in the tab accepting apertures 150. In order to prevent relative motion between the inner bowl 14 and the water flow manifold 120 during use, there are provided projections 154 overlying the upper annular surface 146 of substantially planar annular shoulder 144 and the projections 144 define tapered slots 156. The water flow manifold 18 may be rotated relative to the inner bowl 14 to force the tabs 48 into the slots 156 for locking frictional retention therein. Similarly, the water flow manifold 18 may be rotated in the opposite direction to release the tabs 48 from the slots 154 to allow removal of the inner bowl 14 from the water flow manifold 18.

The third portion 132 of the water flow manifold 18 has a disc like portion 179 having a substantially planar interior face 160 in the water hydration volume 38 and the interior face 160 is provided with a plurality of leg accepting apertures 162 in a spaced relationship.

FIGS. 18, 19, 20 and 21 illustrate various details of the water flow manifold 18 and the mounting thereof on various other components of the embodiment 10. The lower planar annular surface 148 of the substantially planar annular shoulder 144 has a plurality of fin-like members 170 thereon. In the preferred embodiment 10 of the present invention, some of the fin-like members 170 as shown at 170a are full fins extending from the peripheral edge 144a to the hub 180 of the water flow passage 121 and some of the fin-like members 170 are partial fins as shown at 170b extending from the peripheral edge 144a of the substantially planar annular shoulder 144 only part of the distance to the hub 180. The spaces between the fins 170 define waste water discharge flow passages 182 for directing waste water from the waste discharge volume 76 towards the hub 180.

Figure 21:
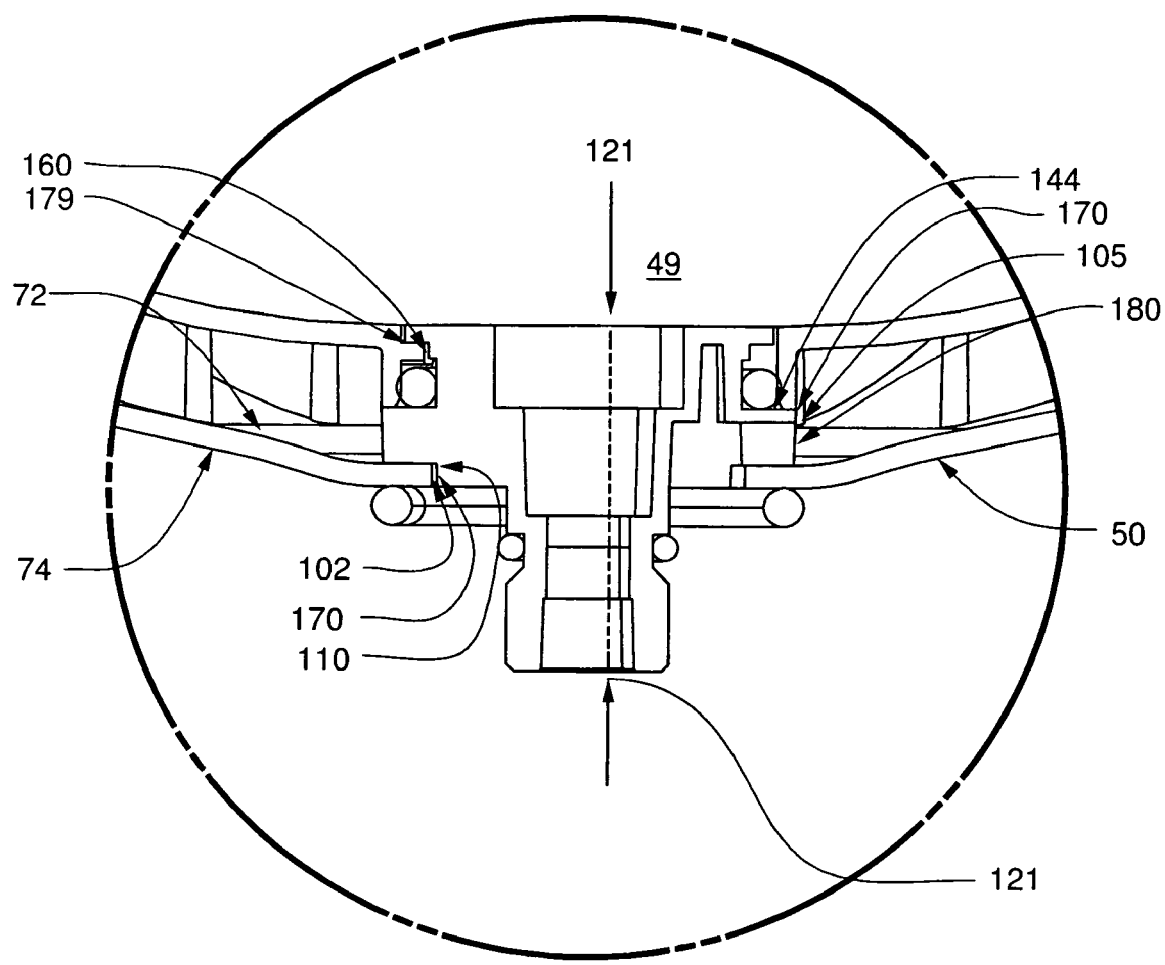
FIG. 21 illustrates the mounting of the outer bowl on the water flow manifold.
Figure 22:
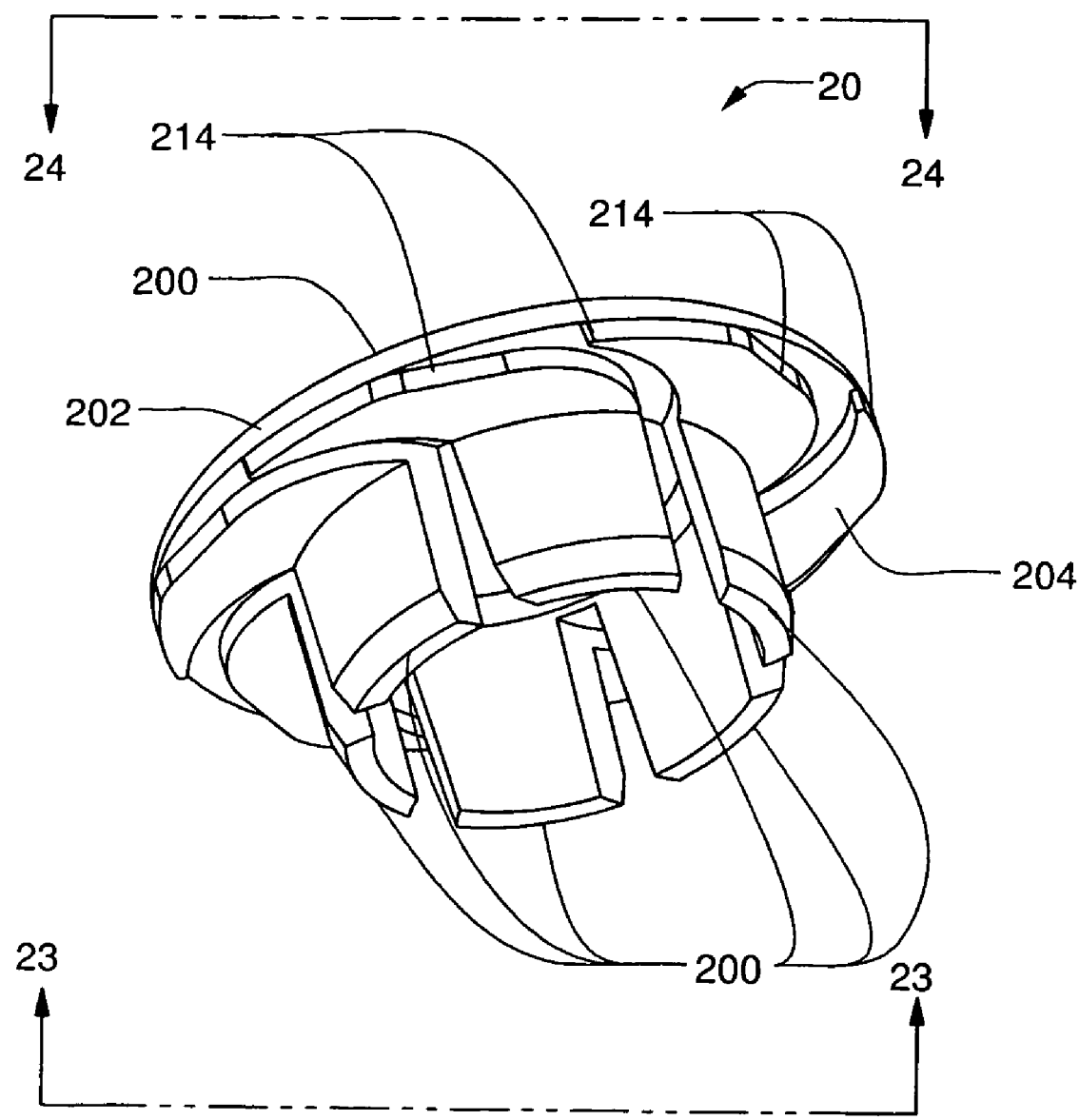
FIGS. 22, 23, 24 and 25 illustrate a vortex cap useful in the practice of the first preferred embodiment of the present invention.
Figure 23:
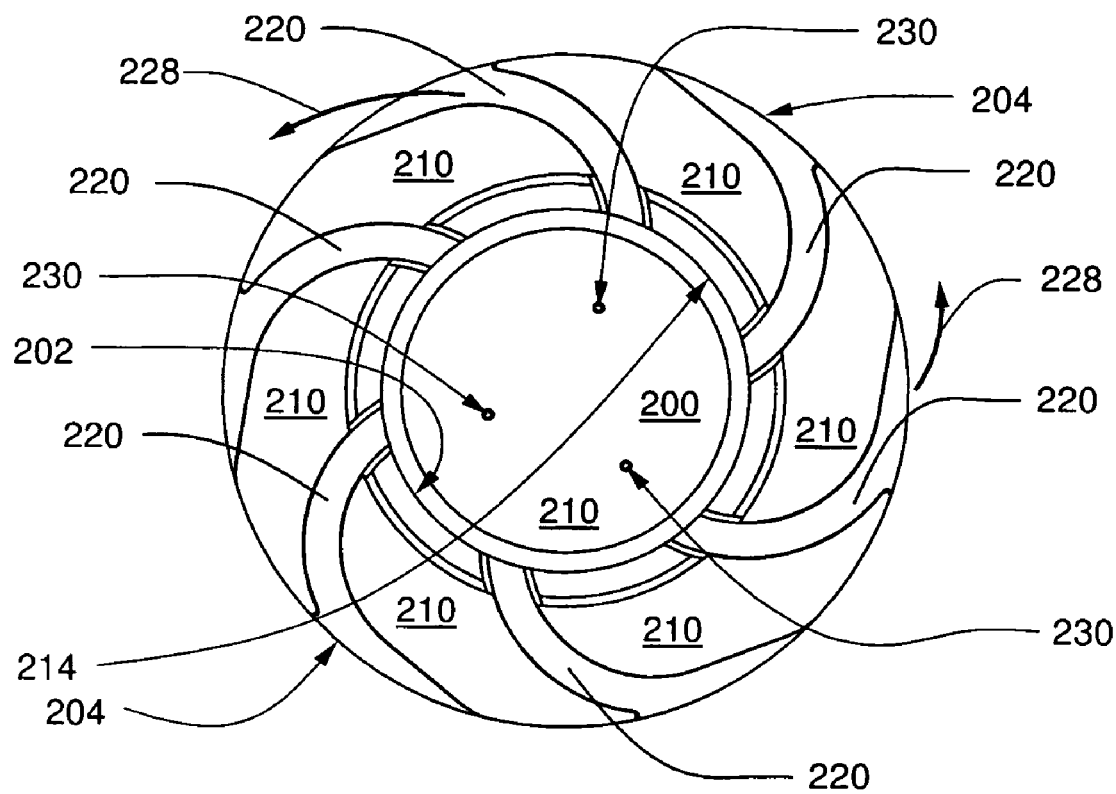
Figure 24:
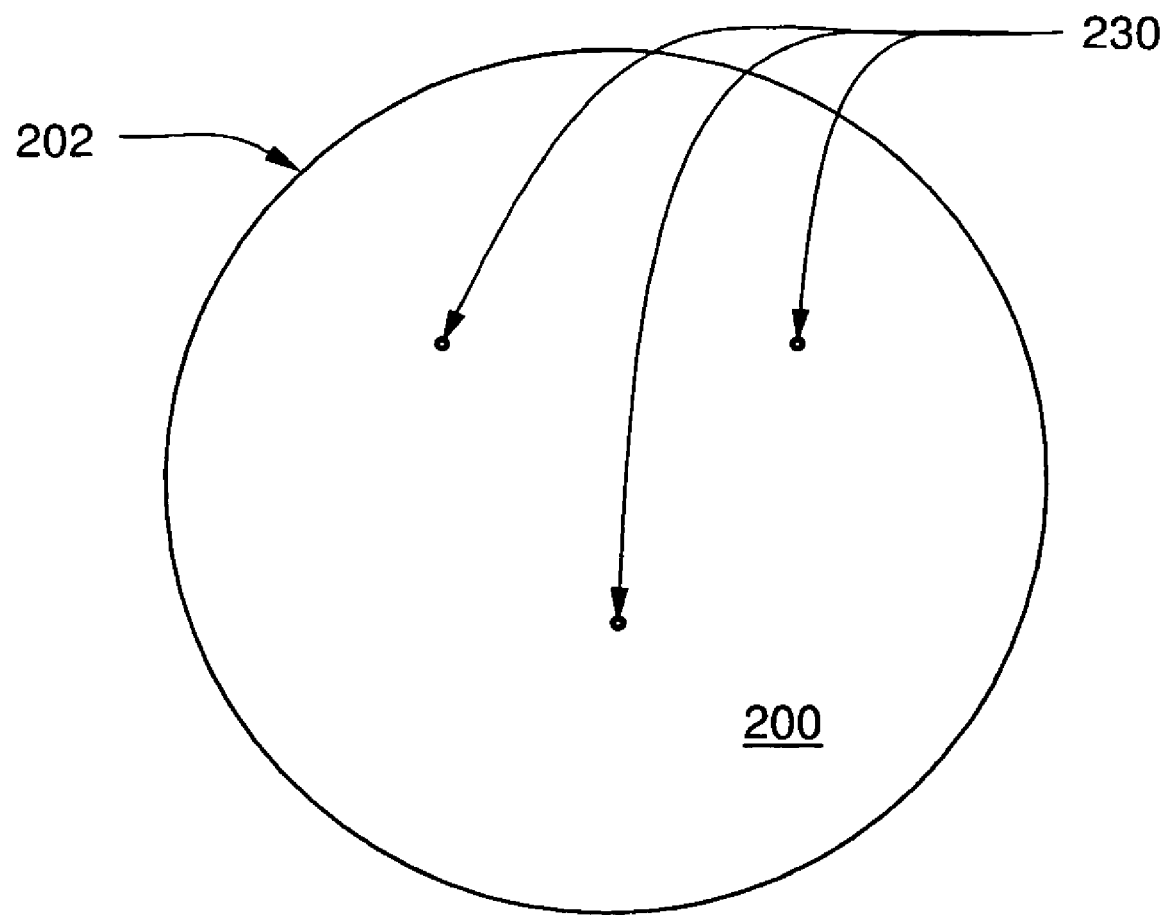
Figure 25:
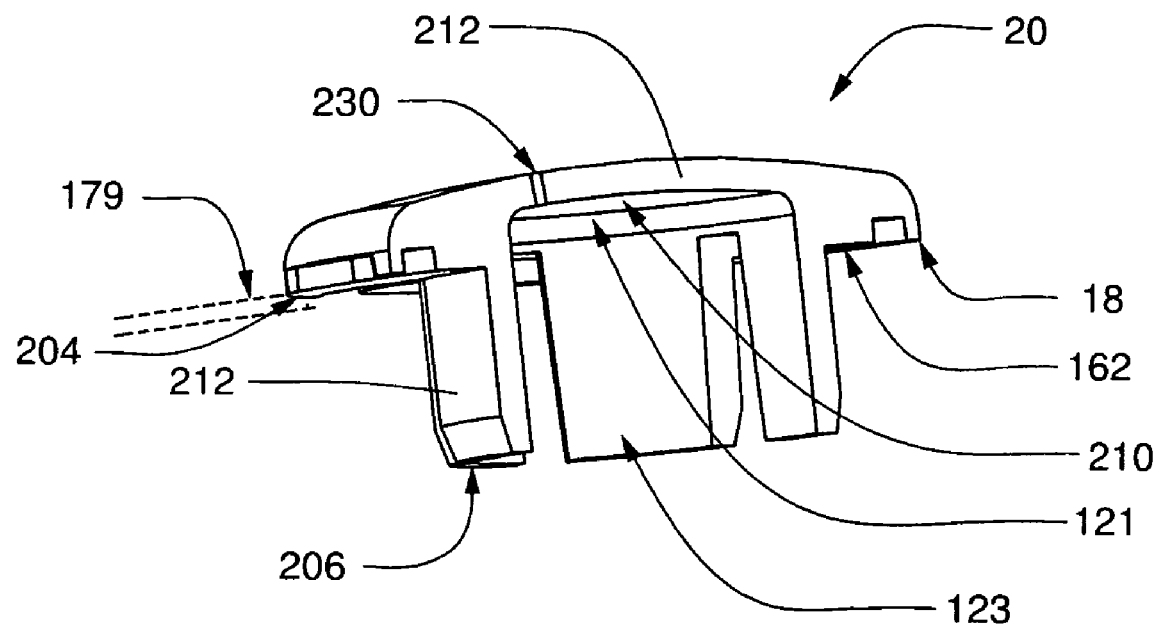

As shown on FIG. 21, a pair of diametrically opposed fin-like members 170a' may have the outer peripheral edges 190 thereof extending towards the peripheral edge 144a of the substantially planar annular shoulder 144 in order to be positioned in the notches 110 of the lower rim edge 102 of the outer bowl 16.

Referring now to FIGS. 22, 23, 24 and 25 there is illustrated thereon the vortex cap 20 which directs the flow of water from water flow manifold 18 into the water hydration volume 38. The vortex cap 20 has a dome shaped top portion 200 and a peripheral wall 202 and an annular inner surface 204 extending around the peripheral wall 202. The vortex cap 20 also has a plurality of legs 206 extending downwardly from the annular inner surface 204 and the legs 206 are insertable into the leg accepting receiving 162 of the water flow manifold 18 so that the annular inner surface 204 is abutting the interior face 179 of the water flow manifold 18. The legs 206 are retained in the leg accepting apertures 162 by a frictional fit therebetween so that the vortex cap 20 may be removed form the water flow manifold 18 as may be desired for cleaning, maintenance or replacement. The vortex cap 20 also has an interior dome shaped inner face 210 that is in spaced relationship to the interior face 169 of the water flow manifold 18 and defines a plenum chamber 212 therebetween. Water flowing into the water flow aperture 121 of the water flow manifold 18 in the direction of the arrow 123 fills the plenum chamber 212 at the pressure of the water. In the preferred embodiments of the present invention, the frictional fit of the legs 206 in the leg receiving apertures 162 is such that the frictional forces retaining the vortex cap on the water flow manifold 18 are greater than the force exerted by the water pressure on the inner face 210.

The annular inner surface 204 has walls 216 defining a plurality of vortex slots 220 providing water flow communication between the plenum chamber 212 and the water hydration volume 38 for the condition of the vortex cap 20 mounted on the water flow manifold 18. The water flowing from the vortex slots in the direction of the arrows 228 (FIG. 23) are at an angle that induces a forced vortex in the water contained in the water hydration volume 38. Such angle may be selected to be close to tangent to the peripheral wall 202 or such other angle so that there is a forced vortex induced in water contained in the water hydration volume 38. As the water in the water hydration volume 38 undergoes the forced vortex action induced by the water flowing from the slots 220 it is often desirable to insure that the center of the vortex also have a supply of water. Jet apertures 230 extend from the plenum chamber 212 through the dome shaped top portion 200 to introduce water in a direction aligned with the central axis 49 or at such angle thereto as may be selected for particular applications to provide the water in regions of the central axis 49 during the forced vortex action.

Figure 26:
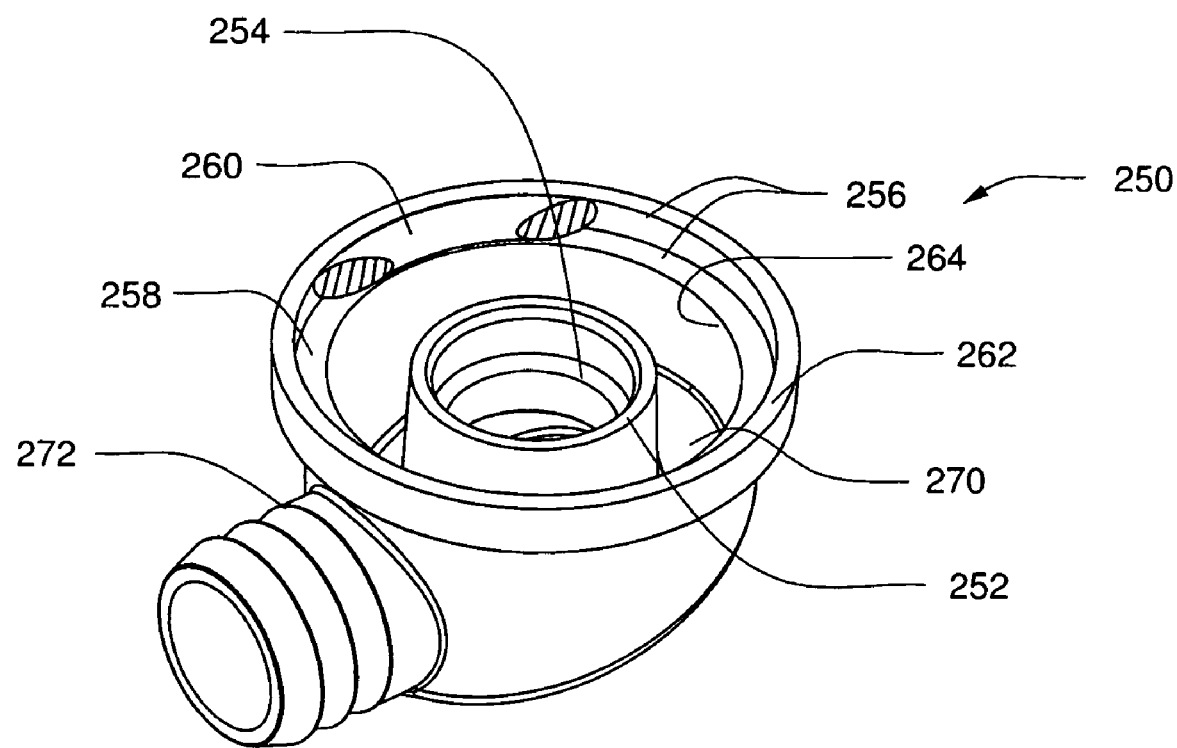
FIGS. 26 and 27 illustrate a discharge water cup 250 useful in the practice of the first preferred embodiment 20 of the present invention.
Figure 27:
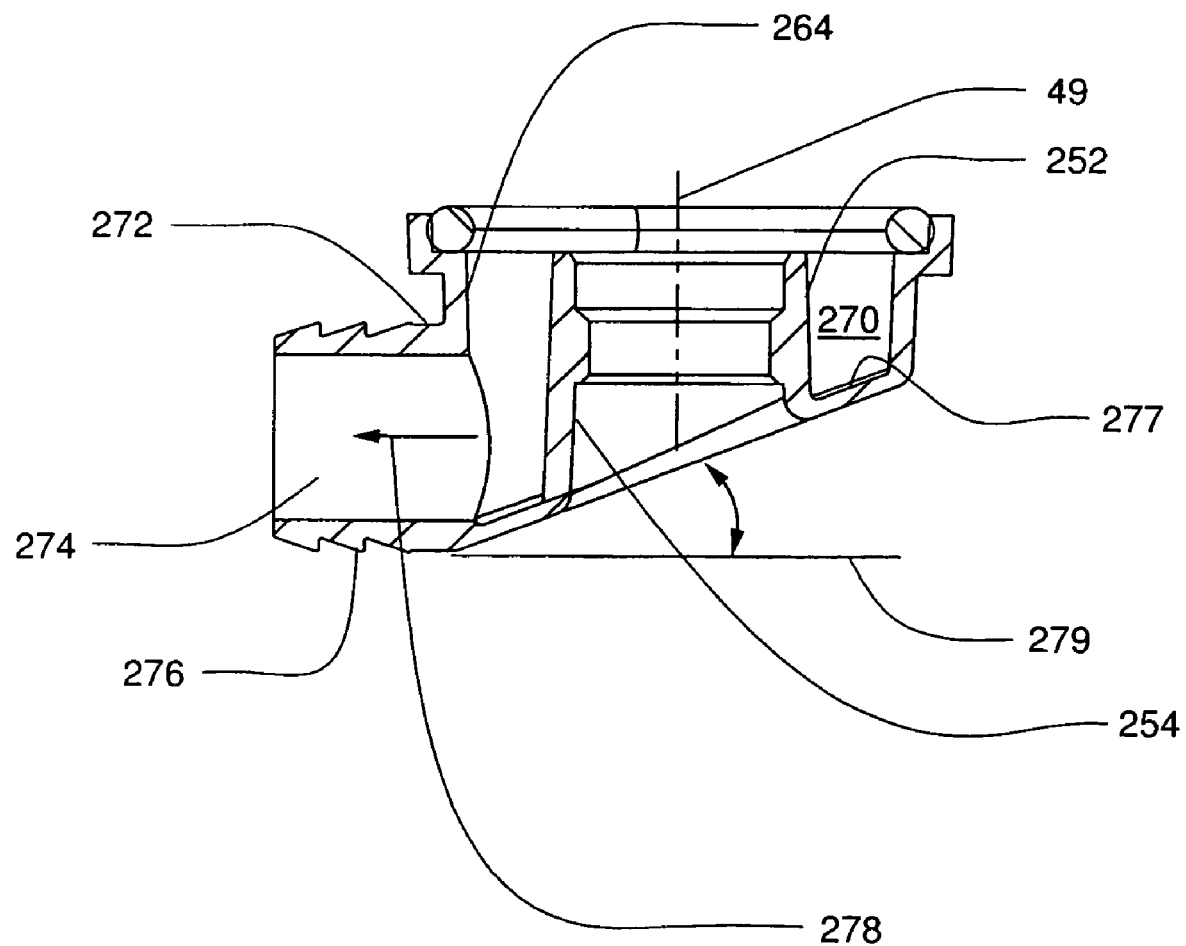

FIGS. 26 and 27 illustrate a discharge water cup 250 useful in the practice of the present invention. The discharge water cup 250 has an internal boss 252 with internal threads 254 that threadingly engage the external threads 124 of the inlet water boss 122 of the water flow manifold 18. The discharge water cup also has first walls 256 defining a seal groove 258 for accepting a seal, such as "O" ring 260. For the condition of the discharge water cup 250 installed on the water flow manifold 18, tightening the connection therebetween forces the upper edge 262 of the seal groove 258 as well as the "O" ring 260 outer surface 74 of the outer bowl 216 in regions adjacent the lower rim edge 102 to provide a seal therebetween. The discharge water cup 250 also has second walls 264 defining an annular waste water accumulator volume 270 for receiving the waste water and any entrained debris therein from the waste discharge volume 76. A discharge water boss 272 has a flow aperture 274 for directing the flow of waste water in the direction of the arrow 278 from the annular waste water accumulator volume 274 through the boss 272 and through a connector 276. A suitable waste water discharge conduit may be connected to the connector 276 for discharging the waste water and accumulated debris therein to a selected disposal site such as a water drain, a sewer connection or the like. In those applications of the present invention where there is a convenient waste water drain, such as an acceptable sewer drain or the like, the bottom surface 277 of the annular waste water accumulator volume 274 is at an angle "A" to the horizontal indicated by line 279 to allow the waste water to flow in the direction of the arrow 278 by gravity.

Figure 28:
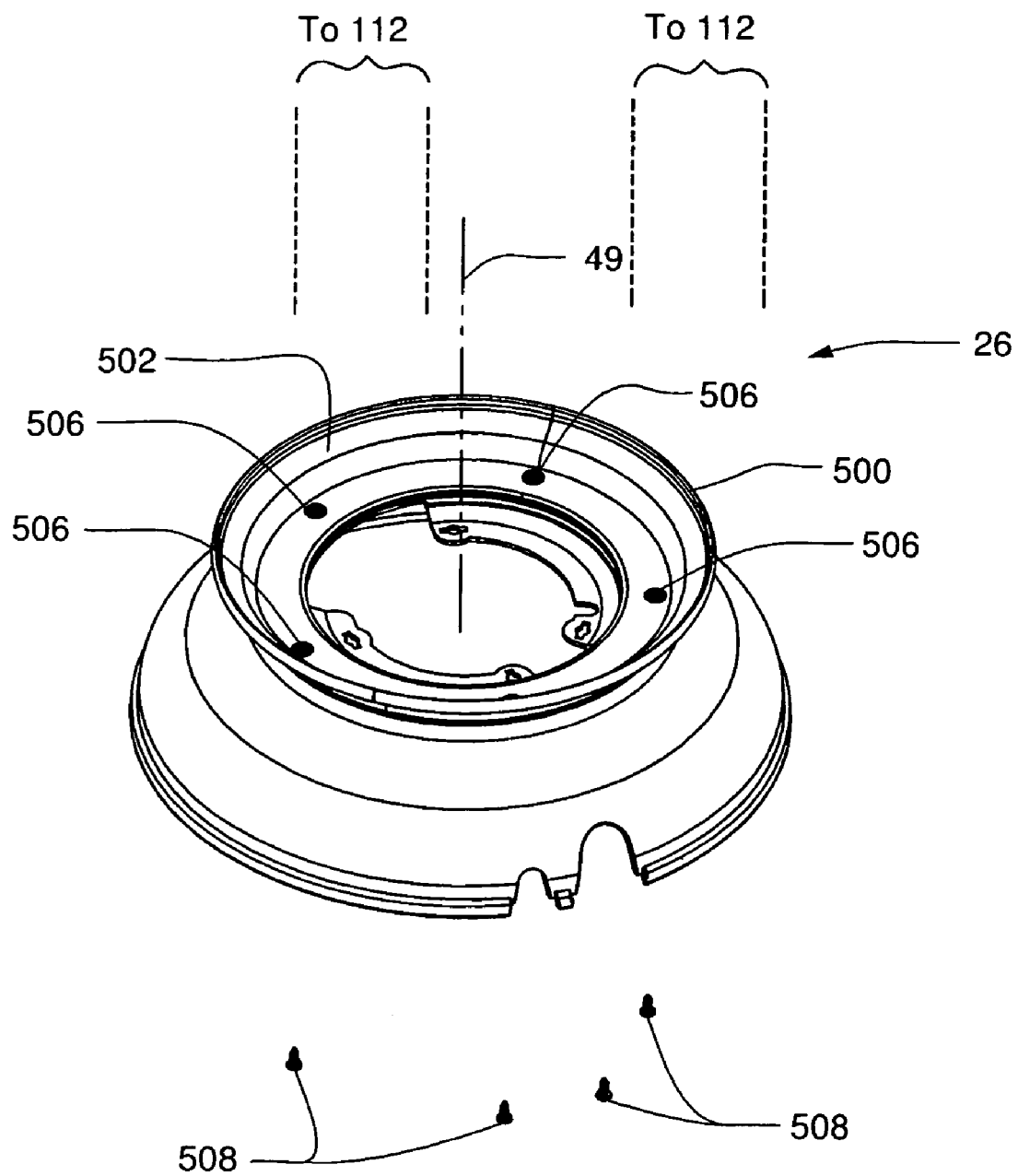
FIG. 28 illustrates a base for supporting the hydration system.

FIG. 28 illustrates the base 26 useful in the practice of the various embodiments 10 of the present invention for supporting the hydration system on a chosen surface. The base 26 has a generally annular connecting portion 500 with interior walls 502 that bear against the outside surface 74 of outer bowl 18 and a generally annular supporting surface 504. The interior walls 502 have screw apertures 506 through which screws 508 pass for screw connections to the screw accepting apertures 116 of the screw accepting bosses 112.

Figure 29:
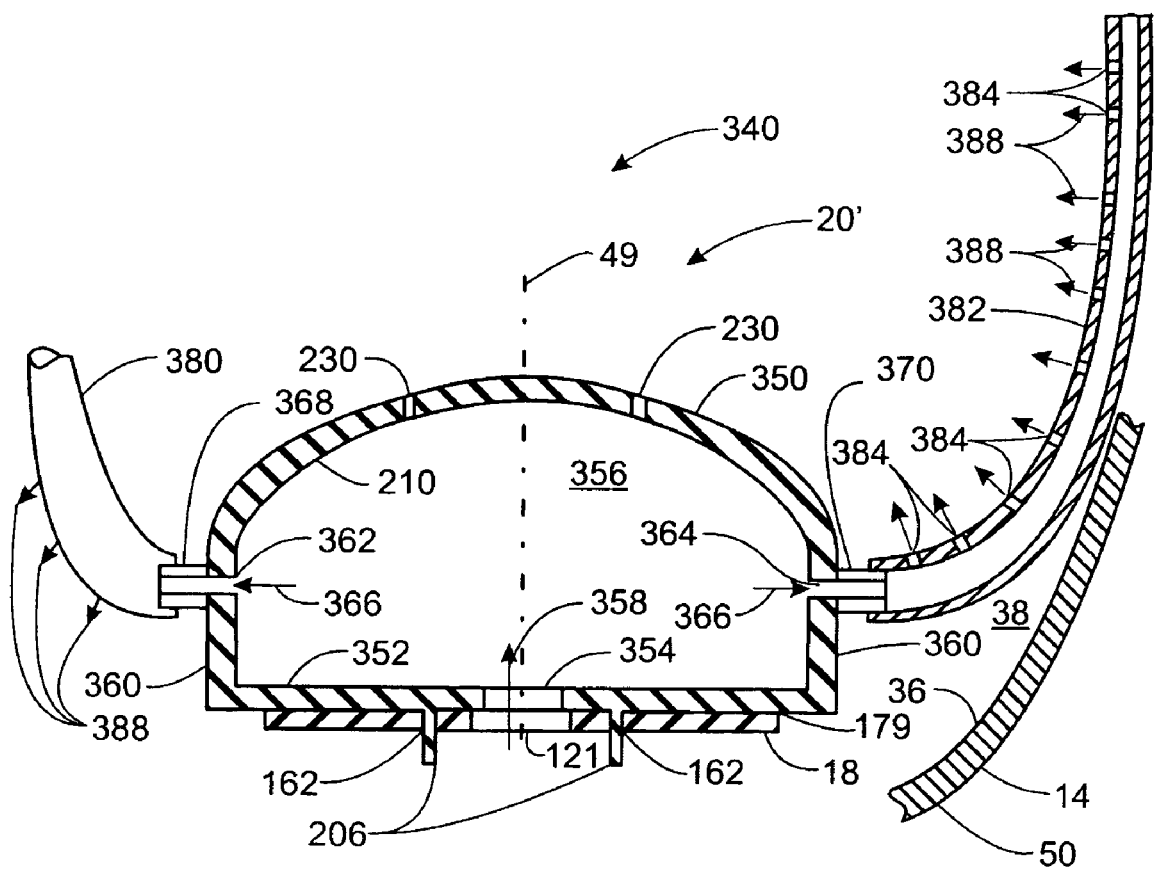
FIG. 29 illustrates a second preferred embodiment of a vortex cap.

FIG. 29 illustrates another preferred vortex cap 20' in an embodiment 340 of the present invention. The vortex cap 20' is generally similar to the vortex cap 20 described above and has a dome shaped top portion 350 and a disc like base portion 352. The disc like base portion 352 of the vortex cap 20' overflies the interior face 179 of the water flow manifold 18 and has an aperture 354 aligned with the flow passage 121 so that water flowing in the water flow passage 121 enters the plenum chamber 356 defined by the dome shaped top portion 350 and the disc like base portion 352 as indicated by the arrow 368. The disc like base portion 352 also has legs 206 which are frictionally retained in the leg accepting apertures 162 of the water flow manifold 18. The vortex cap 20' has side walls 360. A pair of apertures 362 and 364 are in the side wall 360 to allow water in the plenum chamber 356 to flow therethrough as indicated by the arrows 366. Tube connectors 368 and 370 are coupled to the side wall 360 and are aligned with the apertures 362 and 364 to allow water to flow therethrough. Vortex tubes 380 and 382 are connected to the tube connectors 368 and 370 and receive the water flowing therethrough. The vortex tubes 380 and 382 are substantially similar and in this embodiment extend upwardly along the inside surface 36 of inner bowl 14 to regions adjacent the upper rim thereof. The vortex tubes have a plurality of space apart discharge ports 384 extending up to the end of the vortex tubes 380 and 382 from which water jets 388 flow. Water jets 388 flow in the same direction from each of the vortex tubes 380 and 382 in a vortex inducing direction as indicated by the water jets 388. The vortex inducing direction of the water jets 388 may be substantially tangential to the inside surface 36 of the inner bowl 14, or such other angle that will induce the forced vortex of the water contained in the water hydration volume 38. The number of vortex tubes may less than the two shown on FIG. 29 or may be greater than two. The vortex tubes may be oriented at any desired angle with respect to the inside surface 36 of the inner bowl 18 to produce the induced vortex of the water in the water hydration volume 38.

Figure 30:
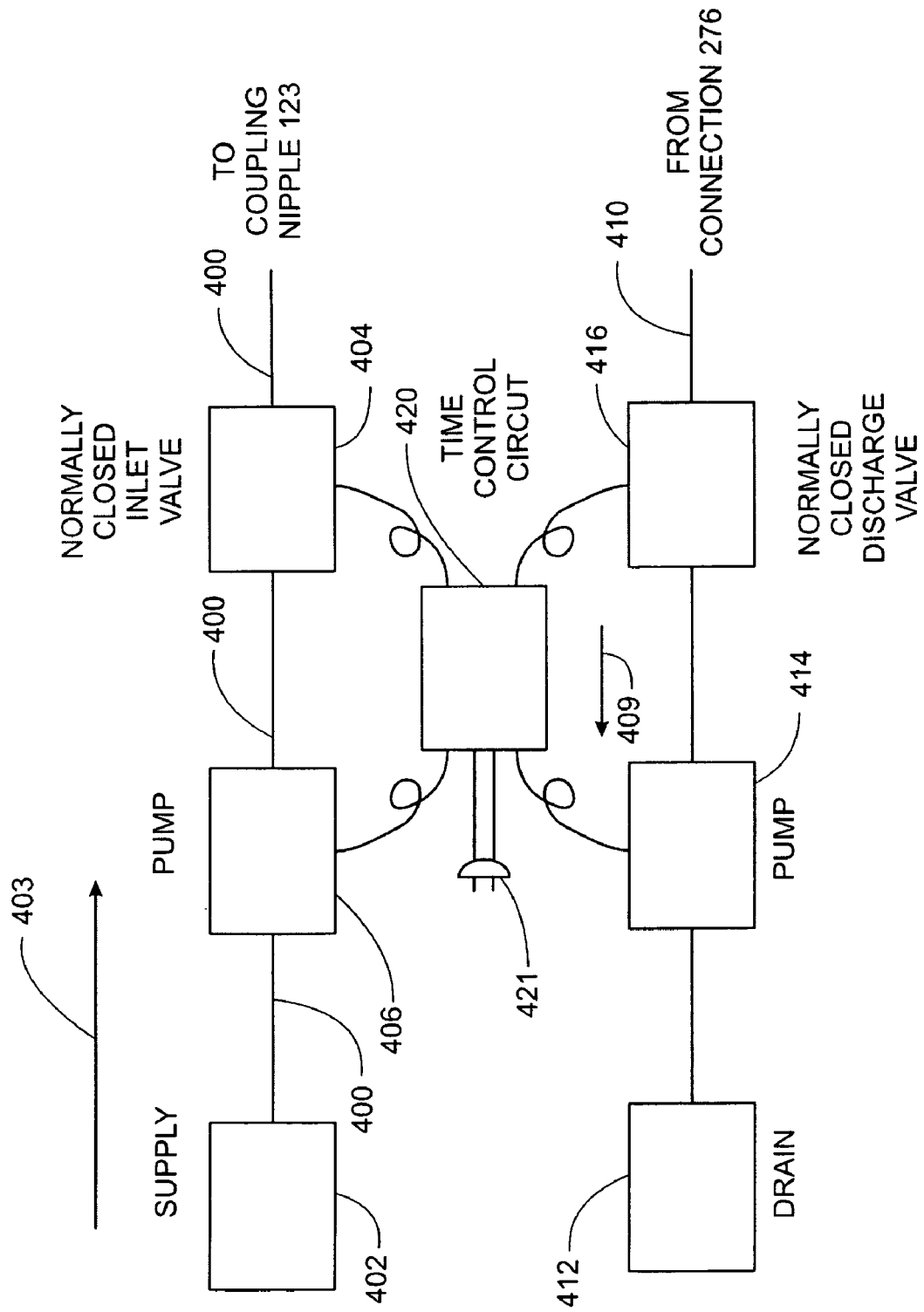
FIG. 30 is a block diagram of the water flow paths of the preferred embodiments of the present invention.

FIG. 30 is a block diagram showing the flow paths of the fresh water to the hydration system and the waste waster discharge from the hydration system. An inlet water conduit 400 is connected to a fresh waster supply 402. The fresh water supply 402 may be, for example, a municipal water supply, a lake, a river or the like. For the applications where the fresh water supply 402 is a municipal water supply, such water supply generally has a pressure on the order of 40 PSI to 80 PSI. Water in this pressure range is satisfactory for operation of the hydration system. If the water supply 402 is not pressurized, a pump 406 may be placed in the inlet water conduit 400 to bring the pressure of the water up to a desired operating pressure.

The conduit 400 directs fresh water from the fresh water supply 402 to a valve 404 as indicate by the arrow 403. The valve 404 may be a manually operated valve or a normally closed solenoid valve to the normally closed solenoid valve. For the valve 404 in the open position thereof water flows through the valve to the coupling nipple 123 at the water flow manifold 18. For the valve 404 in the closed position, no water flows to the nipple 123.

The waste water discharged from the annular waste water accumulator volume 274 at the connector 276 thereof flows into a discharge water conduit 410 in the direction of the discharge arrow 409. If gravity flow of the waste discharge water is satisfactory, the waste water may flow directly from the connector 276 to a suitable drain 412 such as a sewer connection. In those applications of the present invention where gravity flow of the waste water is not sufficient to provide substantially complete evacuation of the waste water in the waste discharge volume 76, a discharge pump 414 may be placed in the discharge conduit 410 to pump the waste water in the direction of the discharge arrow 409 to the drain 412. Additionally, in some applications it may be desirable to place a discharge valve 416 in the discharge conduit 410. The valve 416 may be a manually operated valve or a solenoid valve. The valve 426 is preferably in the open position thereof for the condition of the inlet valve 404 in the open position thereof.

For those embodiments of the present invention where electrically operated pumps 406 and 414 and the valves 404 and 416 are electrically operated solenoid valves, a suitable timer control circuit 420 is utilized to selectively open and close the valves 404 and 416 and turn the pumps 406 and 414 on and off in accordance with a preselected schedule of operation. The timer control circuit 420 is connected to an appropriate source of electrical energy as indicated at 421 such as normal 120 volt AC current as provided by the power grid in the United States. In those applications of the present invention where the hydration system is located in remote areas where there is no convenient source of the 120 volt AC power, a battery (not shown) may be utilized as the source of electrical energy.

The operation of the hydration system is primarily controlled by the position of the valve 404. Upon the initial fill up of the water hydration volume 38, or after the hydration system is disassembled for maintenance and/or cleaning, the valve 404 is in the open position and clean fresh water from the water supply 402 flows into the coupling nipple 123 at the water flow manifold 18, through the inlet water aperture 121, through the slots 220 of the vortex cap 20 and into the water hydration volume 38 of the inner bowl 14. The pump 406, if utilized, is turned on when the valve 404 is in the open position. After a first predetermined time period, the water hydration volume 38 is full and the valve 404 is closed, and pump 406, if utilized, is turned off. The animal may then drink the water from the water hydration volume 38.

When the animal drinks the water very often debris from the animals mouth or other debris may fall into the water in the water hydration volume 38. After a second predetermined time period, when the animal has had full opportunity to drink the water and it has been determined that clean fresh water is appropriate for the animal, the inlet valve 404 is placed in the open position and the pump 406, if utilized, is turned on. Simultaneously, if the discharge pump 414 and discharge valve 416 are utilized, the discharge pump 414 is turned on and the discharge valve 416 is placed in the open position.

The water flowing from the slots 220 in the vortex cap 20 induces the water in the water hydration volume 38 to rotate about the central axis 49 in a forced vortex. The forced vortex has sufficient strength to dislodge any debris that may have adhered to the inside surface 36 of the inner bowl 14. The continual flow of clean fresh water into the water hydration volume 38 eventually fills the water hydration volume to an overflow condition and the water and entrained debris flows out of the water drain flow passages 42 of the inner bowl 14 and into the waste discharge volume 76. If some of the water from the vortex action spills over the top 64 of annular portion 40 of inner bowl 14, such water flows through the water flow passages 70 in the annular portion 66 of the top edge member 30 and into the discharge water volume 76. The water from the discharge water volume 76 flows into the discharge conduit 410 and to the drain 412. At the conclusion of the second predetermined time period the valve 404 is closed and inlet pump 406 is turned off. The pump 414 may also be turned odd and if desired the valve 416 placed into the closed position. The duration of the second predetermined time period is selected based on the size and number of the animals that may be drinking from the hydration volume, the size of the water hydration volume 38 and discharge water volume 76 and the environmental conditions in the regions containing the hydration system. The environmental conditions may be such the sand, dirt, leaves or the like fall or are blown by the wind into the water in the water hydration volume. This cycle is then repeated as often as necessary or desired so that there is the desired clean, fresh water for the animal or animals drinking the water in the water hydration volume.

From the above it can be seen that the present invention enables the provision of clean, fresh water for an animal or animals to drink in a bowl shaped container of a hydration system and the clean fresh water is periodically replaced in the bowl as the old water from which the animals had been drinking and which may contain entrained debris is removed from the bowl. During the replenishment of the clean, fresh water into the bowl the water in the bowl is made to undergo a forced vortex action that dislodges any debris adhering to the sides of the bowl and the water with the debris in a slurry like mixture is discharged into an appropriate drain. The replenishment of the clean fresh water and the discharge of the water from which the animal had been drinking may be made on an automatic, repetitive cycle or may be manually controlled as desired for particular applications. The hydration system may be utilized in households for providing the clean fresh water to house pets or may be provided for larger animals such as farm animals or animals in a zoo as desired for particular applications. In the preferred embodiments of the present invention the various components are removably connected to each other so that the hydration system may be easily and conveniently disassembled for routine cleaning and maintenance.

Although specific embodiments of the present invention have been described above with reference to the various Figures of the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

What is claimed is:

1. A hydration system for animals, comprising, in combination:
   a nested double bowl having an inner bowl and an outer bowl, and each of said inner bowl and said outer bowl having inside surfaces and outside surfaces, and said inside surface of said inner bowl spaced a preselected distance from said inside surface of said outer bowl to define a waste discharge volume therebetween, said outside surface of said inner bowl defining a water hydration volume, and each of said inner bowl and said outer bowl having an upper rim edge and a lower rim edge, and said upper rim edge of said outer bowl and said upper rim edge of said inner bowl defining first preselected geometrical configurations having first areas and said lower rim edge of said outer bowl and said lower rim edge of said inner bowl defining second preselected geometrical configurations having second areas, and said first preselected areas are greater than said second preselected areas, and said nested bowl having a central axis perpendicular to said first preselected area and said second preselected area;
   said lower rim edge of said inner bowl in close proximity to said lower rim edge of said outer bowl;
   a top edge member mounted between said upper rim edge of said inner bowl and said upper rim edge of said outer bowl and said top edge member having a plurality of water flow passages providing water flow passages into said waste discharge volume therethrough;
   said inner bowl having a plurality of water drain flow passages in regions adjacent said upper rim edge to provide water flow passages from said hydration volume into said waste discharge volume;
   a plurality of fins mounted on said inner surface of said outer bowl and extending a predetermined distance from regions adjacent said lower rim edge of said inner surface of said outer bowl toward said upper rim edge thereof;
   a plurality of waste discharge ports at said lower rim edge of said outer bowl for providing waste water flow passages from said waste discharge volume to regions external said outer bowl;
   a water flow manifold in said second preselected areas of said lower rim edges of said inner bowl and said outer bowl and said water flow manifold having an inlet water aperture providing water flow communication from regions external said hydration system to an interior face of said water flow manifold in said water hydration volume of said inner bowl;
   a vortex cap mounted on said water flow manifold in said water hydration volume in water receiving relationship to said inlet water aperture of said water flow manifold, and said vortex cap having forced vortex slots therein providing water flow communication between said inlet water aperture and said hydration volume and oriented at a preselected forced vortex generating angle with respect to said hydration volume.

2. The system defined in claim 1 wherein:
said vortex cap having:
   a dome shaped top portion having an inner surface spaced from said water flow manifold in regions adjacent said inlet aperture to define an inlet water receiving plenum chamber with said water flow manifold;
   a peripheral wall having an annular inner surface abutting said water flow manifold, and said peripheral wall having walls defining said forced vortex slots.

3. The system defined in claim 2 wherein:
said peripheral wall of said dome shaped top portion of said vortex cap has a circular outer surface and has a central axis;
said peripheral wall of said vortex cap has a plurality of legs for detachably mounting said vortex cap on said water flow manifold.

4. The system defined in claim 3 wherein:
said vortex slots in said peripheral wall of said vortex cap are substantially spiral and each of said vortex slots having an inlet end in said plenum chamber and an outlet end in said water hydration volume of said inner bowl;
said dome shaped portion of said vortex cap has walls defining a plurality of water jet apertures therethrough and extending at a predetermined angle to said central axis; and,
a seal means between said water flow manifold and said inner bowl.

5. The system defined in claim 2 wherein:
said dome shaped top portion of said vortex cap has walls defining a plurality of water jet apertures therethrough and extending at a predetermined angle to said central axis.

6. The system defined in claim 5 wherein:
said peripheral wall of said dome shaped top portion of said vortex cap has a circular outer surface and has a central axis;
said peripheral wall of said dome shaped top portion of said vortex cap has a plurality of legs for detachably mounting said vortex cap on said water flow manifold.

7. The system defined in claim 2 wherein:
said vortex cap further comprises at least one tube having a first tube end and a second tube end and a tube body portion therebetween;
said first tube end of said at least one tube connected in water receiving relationship to said plenum chamber;
said body portion of said at least one tube member aligned along said outer surface of said inner bowl and having a plurality of water jet outlet apertures therethrough and said water jet outlet apertures aligned in a vortex inducing angle with respect to said hydration volume of said inner bowl.

8. The system defined in claim 2 wherein:
said vortex cap further comprises a plurality of tubes each of said plurality of tubes having a first tube end and a second tube end and a tube body portion therebetween;
said first end of each of said plurality of tubes tube connected in water receiving relationship to said plenum chamber;
said body portion of said of each of said plurality of tubes aligned along said outer surface of said inner bowl and each of said plurality of tubes having a plurality of water jet outlet apertures therethrough and said water jet outlet apertures aligned in a vortex inducing angle with respect to said hydration volume of said inner bowl.

9. The system defined in claim 8 wherein:
said peripheral edge of said dome shaped top portion of said vortex cap is circular and has a central axis;

said peripheral wall of said vortex cap has a plurality of legs for detachably mounting said vortex cap on said water flow manifold.

10. The system defined in claim 1 and further comprising:

a water inlet conduit connected to said inlet water aperture of said water flow manifold;

a discharge conduit connected to said water flow manifold for providing waste water discharge communication from said waste discharge volume to regions external thereof.

11. The system defined in claim 1 wherein:

said top edge member is fixedly coupled to said upper rim edge of said inner bowl and comprises:

a substantially planar annular portion extending outwardly from said upper rim edge of said inner bowl and having an inner coupling edge connected to said upper edge portion of said inner bowl, and an outer coupling edge;

an outer raised upstanding arcuate portion coupled to said outer coupling edge of said substantially planar annular portion and extending above said upper rim edge of said inner bowl and defining an upper rim edge accepting cavity for removably accepting said upper rim edge of said outer bowl.

12. The system defined in claim 11 wherein:

said plurality of water drain flow passages of said inner bowl are spaced intermediate said connection of said substantially planar annular portion of said top edge member and said lower rim edge of said inner bowl;

said plurality of water flow passages of said top edge member are in spaced relationship in said substantially planar annular portion of said top edge member.

13. The system defined in claim 12 wherein:

said top edge portion is unitarily fabricated with said inner bowl.

14. The system defined in claim 12 wherein:

said upper rim edge of said inner bowl is circular;

said upper rim edge of said outer bowl is circular;

said lower rim edge of said inner bowl is circular;

said lower rim edge of said outer bowl is circular;

said top edge portion is unitarily fabricated with said inner bowl;

and wherein:

the area defined by said upper rim edge of said inner bowl is greater than the area defined by said lower rim edge of said inner bowl; and, the area defined by said lower rim edge of said outer bowl is greater than the area defined by said lower rim edge of said outer bowl.

15. The system defined in claim 14 wherein:

said vortex cap having:

a dome shaped top portion having an inner surface spaced from said water flow manifold in regions adjacent said inlet aperture to define an inlet water receiving plenum chamber with said water flow manifold;

a peripheral wall having an annular inner surface abutting said water flow manifold, and said peripheral wall having walls defining said forced vortex slots.

16. The system defined in claim 15 wherein:

said vortex cap having:

a dome shaped top portion having an inner surface spaced from said water flow manifold in regions adjacent said inlet aperture to define an inlet water receiving plenum chamber with said water flow manifold;

a peripheral wall having an annular inner surface abutting said water flow manifold, and said peripheral wall having walls defining said forced vortex slots said peripheral wall of said dome shaped top portion of said vortex cap has a circular outer surface and has a central axis;

said peripheral wall of said vortex cap has a plurality of legs for detachably mounting said vortex cap on said water flow manifold.

17. The system defined in claim 16 wherein:

said dome shaped top portion of said vortex cap has walls defining a plurality of water jet apertures therethrough and extending at a predetermined angle to said central axis.

18. The system defined in claim 17 wherein:

said plurality of vortex slots in said peripheral wall of said vortex cap are substantially spiral and each of said plurality of said slots having an inlet end in said plenum chamber and an outlet end in said water hydration volume of said inner bowl;

said dome shaped portion of said vortex cap has walls defining a plurality of water jet apertures therethrough and extending at a predetermined angle to said central axis; and, a seal means between said water flow manifold and said inner bowl.

19. The system defined in claim 18 and further comprising:

a water inlet conduit having a first end connected to said inlet water aperture of said water flow manifold and a second end connected to a source of fresh water;

a discharge conduit having a first end connected to said water flow manifold for receiving waste water discharge and a second end connected to a drain.

20. The arrangement system defined in claim 19 and further comprising:

an inlet valve in said water inlet conduit.

21. The arrangement system defined in claim 20 wherein:

said inlet valve is a normally controlled solenoid valve.

22. The system defined in claim 21 and further comprising:

a discharge valve in said discharge conduit.

23. The system defined in claim 21 and further comprising:

a pump in said discharge conduit.

24. The arrangement defined in claim 23 and further comprising:

a normally closed solenoid discharge valve in said discharge conduit;

a control arrangement operatively connected to said inlet valve and said discharge valve for selectively opening and closing said inlet valve and said discharge valve in accordance with a predetermined schedule and said control arrangement having a timer for regulating said predetermined schedule;

said control arrangement operatively connected to said pump for operating said pump in synchronous with said operation of said inlet valve and said discharge valve.

* * * * *